United States Patent [19]
Kamada et al.

[11] Patent Number: 5,400,096
[45] Date of Patent: Mar. 21, 1995

[54] AUTOMATED PRINT AND DEVELOPMENT APPARATUS FOR THREE DIMENTIONAL AND CONVENTIONAL PHOTOGRAPHS

[75] Inventors: Shigeharu Kamada; Hiroshi Miyawaki, both of Wakayama; Mitsuhiko Itojima, Naga; Hiroto Nakao; Yoshifumi Nakamura, both of Wakayama; Kazuo Nagaosa, Naga, all of Japan

[73] Assignee: Noritsu Koki Co., Ltd., Wakayama, Japan

[21] Appl. No.: 108,611
[22] PCT Filed: Dec. 21, 1992
[86] PCT No.: PCT/JP92/01672
   § 371 Date: Aug. 27, 1993
   § 102(e) Date: Aug. 27, 1993
[87] PCT Pub. No.: WO93/13454
   PCT Pub. Date: Jul. 8, 1993

[30] Foreign Application Priority Data

Dec. 27, 1991 [JP] Japan ................................. 3-359502
Dec. 27, 1991 [JP] Japan ................................. 3-359503
Dec. 27, 1991 [JP] Japan ................................. 3-359504
Dec. 27, 1991 [JP] Japan ................................. 3-359505

[51] Int. Cl.⁶ ......................................... G03B 35/00
[52] U.S. Cl. ................................. 354/112; 354/298; 354/319; 354/334; 355/22; 355/77
[58] Field of Search .................. 354/112–117, 354/123, 124; 355/22, 77; 352/46, 57–64, 82

[56] References Cited

FOREIGN PATENT DOCUMENTS

| | | |
|---|---|---|
| 45-32039 | 10/1970 | Japan . |
| 55-9588 | 1/1980 | Japan . |
| 55-40424 | 3/1980 | Japan . |
| 55-24096 | 6/1980 | Japan . |
| 59-100421 | 6/1984 | Japan . |
| 59-164053 | 11/1984 | Japan . |
| 62-23032 | 1/1987 | Japan . |
| 63-24550 | 2/1988 | Japan . |
| 63-98664 | 4/1988 | Japan . |
| 64-21433 | 1/1989 | Japan . |
| 1-204039 | 8/1989 | Japan . |
| 2-189539 | 7/1990 | Japan . |
| 2-248943 | 10/1990 | Japan . |

Primary Examiner—D. Rutledge
Attorney, Agent, or Firm—Lowe, Price, LeBlanc & Becker

[57] ABSTRACT

Handling of emulsion surfaces of both 3D and conventional photographs in the cases of development and drying processes is made possible by the following providing apparatus including a mechanism for selection of emulsion surface or selective reversal of the photographic paper. The difference in the processing time of 3D and conventional photography is dealt with by switching photographic paper conveying routes in the development section when processed such as development, bleach fixing and stabilizing processes take place. Printing of 3D photography is dealt with by making movable either both an exposure station and a lens or just the lens alone. Furthermore, switching is provided between respective lenses for conventional and 3D photographic printing. A suction type exposure station may be used, and may employ a mechanism to control an adhesive force applied to a photographic paper in the conventional and 3D photography. Processing of 3D photography is improved by incorporating a mechanism to allocate photographic papers into more than two lanes. The automated print and development apparatus of the present invention, which is equipped with the above features, is thus an apparatus that has the ability to perform 3D photographic processing in addition to having the functions of a conventional mini-lab, which processes conventional photographs and has the ability to handle a variety of photographic papers and films.

14 Claims, 33 Drawing Sheets

92/91

95

96

No. 1　　　　No. 2

No. 1   No. 2   No. 3

FIG. 41
(1)
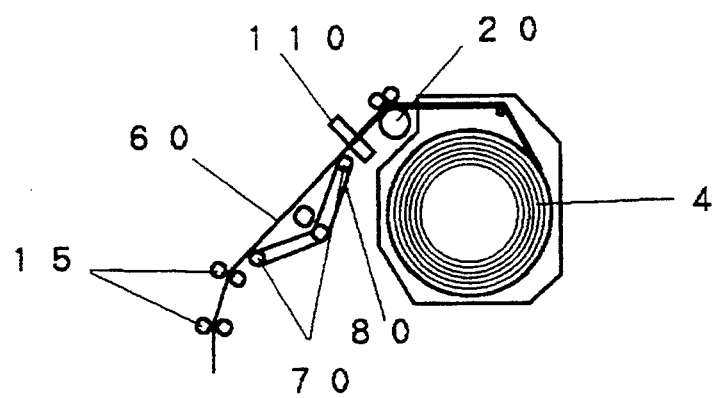
(2)
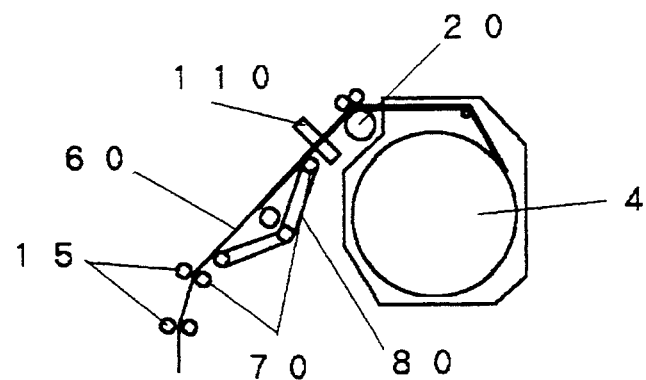
(3)
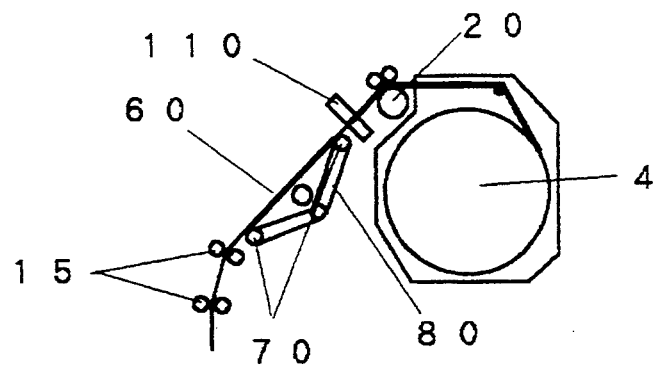
(4)
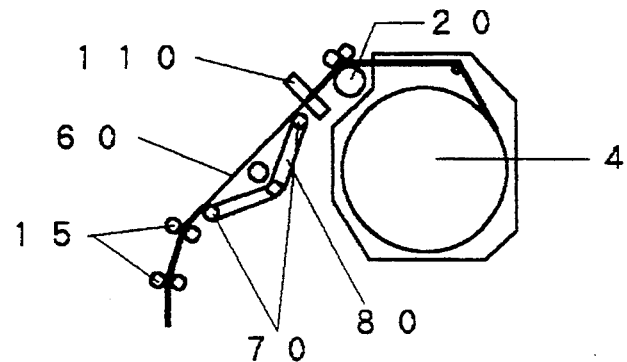

F I G. 4 4
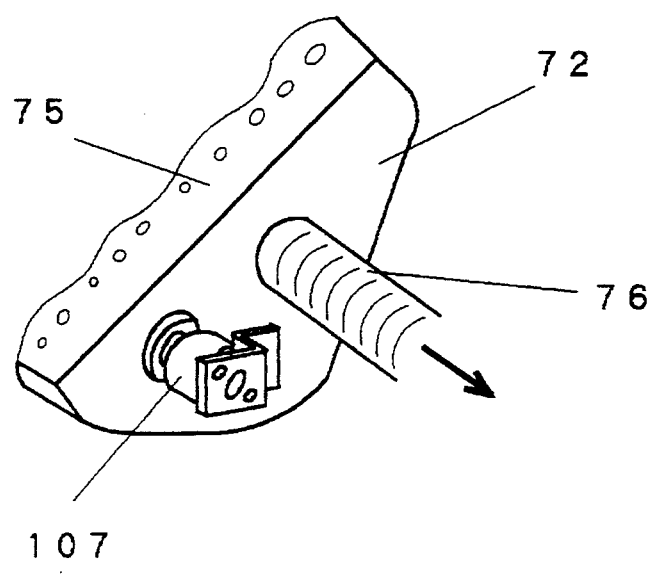
F I G. 4 5
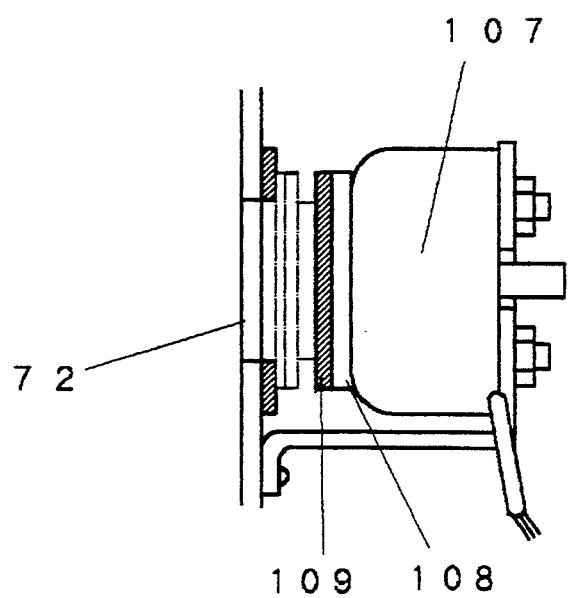

ately photographed, the result of which is that
the two images that the viewer sees become superimposed and the viewer will see a three dimensional image. The distance at which the photograph should be viewed for an excellent three dimensional view depends on the state in which the multiple images have been printed onto the sensitized sheet with LS. It is generally the case to make the three dimensional view visible best from a distance that is roughly the same as from the projecting lens to the sensitized sheet with LS at the time of printing.

AUTOMATED PRINT AND DEVELOPMENT APPARATUS FOR THREE DIMENTIONAL AND CONVENTIONAL PHOTOGRAPHS

TECHNICAL FIELD OF THE INVENTION

This invention relates to a method of printing and development of three dimensional (henceforth referred to as 3D) photographs using sensitized lenticular sheets that are fabricated by applying a sensitized material on the reverse side of a lenticular sheet(henceforth referred to as LS). It also relates to print and development apparatuses of both the 3D and the conventional photographs.

BACKGROUND OF THE PRIOR ART

In three-dimensional (3D) photography where LS is used, "indirect methods" are common. In indirect methods, a camera that is loaded with a sensitized conventional film is horizontally displaced by fixed amounts with respect to the 3D object to make a number of negatives for the same single object. These negative films are such that they have the object images in the film at different positions in accordance with the distance to the object from the camera. Apart from this method of photographing where the camera is moved horizontally in straight lines, there are photograph methods where the camera is moved with respect to the object in an arc. In either of these methods, it is necessary to get several object images from different viewing points. Other than the camera being moved for photographing, it is also possible to make negatives with a camera that has several lenses arranged horizontally or with several horizontally placed cameras that operate simultaneously. As to the number of negatives required, there is no special fixed number; three to five negatives are common.

In the "indirect method," the multiple negatives obtained in the above mentioned process are each exposed, by having the projection angle varied for the each negative, onto a sensitized film containing LS that is fabricated by applying a sensitized material on the smooth side of an LS. When an image is developed on a sensitized film containing LS from a negative by an ordinary projection lens, the image projected onto the sensitized layer, which is on the back side of the lenticular lenses, will be divided at each lenticular lens into line images due to the fact that the lenticular lenses contract images sideways. As the next step in the process, the other negative in the order is used with the relative positions of the projection lens and the sensitized film containing LS changed and with the exposure done so that a new line image is developed next to the line image that was developed in the previous exposure. Likewise, the breadth of the reverse side of the lenticular lens is successively filled with line images from each negative. In that manner, it is possible to print images from several negatives onto a single sheet of sensitized material. This printing can even be done using several projection lenses, with a single exposure.

The LS with the print that was obtained as described above is then developed. When viewed from the side of the lenticular lenses, the line images formed on the sensitized layer are expanded again sideways and will be seen as a restored image. In addition, a viewer will see from its either eye a different image of what has been systematically photographed, the result of which is that the two images that the viewer sees become superim- As described above, 3D photography uses methods that are vastly different from those in the conventional photography with regard to the exposure process of printing, photographic printing material and development process, and therefore the 3D photography uses a special print and development apparatus that is different from those in use in the conventional photography. Moreover, manual operations may be involved in the process. Used in the printing process of conventional photography are print and development apparatuses that are equipped with all of the following: the means for feeding negatives and photographic printing papers, a lens and an exposure station of stationary-type and a development and drying means. The outcome of speeding up the handling of print and development in the conventional photographic process, with the photographic quality either retained or improved, was that photographic printing papers with high sensitivity and thin emulsions came to be used, and the times required for exposure, development and drying could further be shortened. Print and development apparatuses also shortened their handling times, and there exist now various types of development apparatuses ranging from large-scale machines for factory-use to small-scale apparatuses for use in retail stores and so on. On the other hand, such diversifications as apparent in special-sized photographs of panorama photography has also progressed, and photographs of various shapes have come to the existence even in the case of conventional photography. Furthermore, even print and development processing has come to accommodate various print sizes.

Apart from the means of exposure, there are large differences in photographic printing papers of the conventional and 3D photography with respect to: the resolution, sensitivity, the substrate, properties and composition of such as the emulsion, and construction. When a photographic processing system is to be considered, as a matter of fact the system has to be one that suites the characteristics of the photo-sensitized substance. Consequently, 3D photographs can not be dealt with using a print and development apparatus for use with conventional photography. Though this implies the need for a special print and development apparatus for processing, 3D photography is not wide-spread and as a result, it will be difficult to find some bulk quantity for processing. Especially when the processing is to be done in a retail store over-the-counter, maintaining a processing equipment will be troublesome due to problems such as developer management and profit making. Such factors further hinder 3D-photography being wide-spread.

If 3D-photographs can be processed using the print and development equipment for conventional photographs, processing over-the-counter would be possible. However, this is not a simple task, because as mentioned above, processing in 3D-photography is vastly different from that in the conventional photography. Many problems will arise, if a means has been contrived by simply putting together the existing know-how to share or jointly use a print and development equipment between the conventional and 3D photography. For instance, if used in 3D-photography, a conventional printing and development equipment will deteriorate its performance due to the facts that the means of exposure is complicated and that the development process also requires longer times. Thus, it is difficult to produce a processing system that adequately performs both in the 3D and conventional photography.

The difficulties that arise when both the 3D and conventional photographic processes are accommodated in one single system are described below:

(1) In the conventional photography, printing is done by exposure from only one fixed direction. In contrast, in the 3D photography, it requires at least 3 to 5 exposures be done with the direction of exposure changed, and hence means are needed for the removal of the negatives, sensitized materials and the lenses.

(2) In conventional photography, the emulsion of a photographic paper is exposed to light. In contrast, in 3D photography a sensitized paper having many small lenticular lenses arranged on one of its surfaces is exposed to light from the side of the lenticular lenses. This implies that the emulsion surface will be in opposite side to that in the conventional photography.

(3) There is a vast difference between the conventional and 3D photography with respect to the characteristics of the photographic paper. Hence, the times taken for developing, bleaching, stabilizing and drying will be different.

In addition, searching solutions to the above problems, further obstacles may arise. The present invention has the objective of realizing an automated print and development apparatus called a Mini-Lab system where the processing of both the 3D and conventional photography can be handled.

DISCLOSURE OF THE INVENTION

In the present invention, means such as the following are devised. First, in order that any photographic paper can be handled, a scheme having the following features is implemented.

(1) Selectively choosing the emulsion surface, development and drying processes are made possible.

(2) Handling of different processing times (of development, bleaching and stabilizing) is made possible.

3) 3D photographic printing is handled by making either the exposure station and the lens movable or the lens alone movable. Moreover, switching from the conventional to 3D photography is made possible.

4) When a suction type exposure station is used, a mechanism is used to control the adhesive strength in the cases of conventional and 3D photography.

5) A means for improving the performance of 3D photographic processing is provided.

An apparatus equipped with these features is one that combines the functions of an existing Mini-lab, which handles conventional photographs, with the functions required for accommodating 3D photography, and that is capable of handling various kinds of printing papers in addition to its ability to processing the conventional films and films for 3D photography. Even in the case of 3D photography, conveyance of printing papers is fully automated from the printing-process to the development-process as in the case of conventional photography, and the operator has only to select the principal object for the 3D photograph. The means for development by selecting the emulsion surface of a sensitized paper is described by illustrations. FIG. 1 is the lengthwise section of the development section of the print and development apparatus of the present invention and FIG. 2 is its cross-section. Labels within the figures are: 3 is photographic paper, 10 is central roller, 81 is a rack, 82 is a process tank, 83 is a nozzle and 84 is an opening for circulation. The developer ejected from the circulation opening 84 passes through the hole of the nozzle located in the rack 81 and strikes on the central roller 10. Having been spread on the roller, the developer comes in contact with the paper 3, the result of which is that unevenness in pictures is eliminated while attempting to improve the picture quality. If several conveying paths are used in combination with the steps just described, no matter on which side of the sensitized paper the emulsion surface is, it is possible to do the development by selecting the emulsion surface.

It is described below by illustrations a drying apparatus that can change its hot-air blowing direction, having selected the emulsion surface. FIGS. 3 to 5 show a typical embodiment of the dryer portion of the print and development apparatus of the present invention. FIG. 3 is the sectional side view, FIG. 4 is the sectional plan and FIG. 5 is the sectional front view of the dryer portion of the apparatus. Labels within the diagrams are: 91 is a fan (trade named Sirocco); 93 is a damper; 103 are the slits in the duct; 95 and 96 are ducts; 97 is conveyor belt and 98 is a heating unit. Hot air draft from the Sirocco fan 91 is directed into the ducts 95 or 96 from the left and right sides by changing its direction with the damper 93. As shown by the arrows in the figures, hot air is sent to the ducts 95 or 96, and the paper is adhered to the conveyer belt 9 with the hot air-blow from the slits 103, and it is dried while being carried by the conveyor belt.

Since the sides of the emulsion are inverted in the 3D and the conventional photography owing to the conditions of exposure, there is a need for the direction of the hot-air draft to be changed, and this change is achieved by fixing a damper 77 and moving the damper in the direction of the arrows to reverse direction of the hot-air blow.

FIGS. 6 to 8 show another embodiment of the dryer section of the print and development apparatus of the present invention. FIG. 6 is the sectional side view, FIG. 7 is the sectional plan and FIG. 8 is the sectional front view of the dryer portion of the apparatus. Labels in the diagrams are: 91 and 92 are the Sirocco fans, 95 and 96 are ducts, 98 is a heating unit and 103 is the slits in the duct. By switching the Sirocco fan from 91 to 92, the direction of hot air blow is changed depending on the case, the conventional or 3D photography.

FIGS. 9 to 11 show yet another embodiment of the dryer section of the print and development apparatus of the present invention. FIG. 9 is the sectional side view, FIG. 10 is the sectional plan and FIG. 11 is the sectional front view of the dryer portion of the apparatus. Labels in the diagrams are: 91 and 92 are the Sirocco fans; 95 and 96 are the ducts; 98 and 99 are heating units and 103 is the slits in the duct. The mechanisms for blowing hot-air in the cases of the conventional and 3D photography, are respectively grouped into two groups: Sirocco fan 91 and the heater unit 98 on the right-hand side; and Sirocco fan 92 and the heater unit 99 on the left-hand side. Air is blown into the ducts 95 or 96 from the left or the right sides.

FIGS. 12 to 14 show still other embodiment of the dryer section of the print and development apparatus of the present invention. FIG. 12 is the sectional side view, FIG. 13 is the sectional plan and FIG. 14 is the sectional front view of the dryer portion of the apparatus. Labels in the diagrams are: 91 is a Sirocco fan; 93 is a damper; 95 and 96 are ducts; 97 is a conveyor belt; 98 is a heating unit and 103 is slits in the duct. Having changed its flow direction by the damper 93, hot air from the Sirocco fan 91 enters the ducts 95 or 96 from one side of the rack. When air is blown into either one of the ducts 95 or 96, the other duct is connected with the inlet of the Sirocco fan by manipulation on the damper 93, and hot air is sucked through the slits 93 on the duct to improve the adherence between the photographic paper and the conveyor belt.

FIGS. 15 to 17 show a further embodiment of the dryer section of the print and development apparatus of the present invention. FIG. 15 is the sectional side view, FIG. 16 is the sectional plan and FIG. 17 is the sectional front view of the dryer portion of the apparatus. Labels in the diagrams are: 91 and 92 are a Sirocco fans; 94 is a damper; 95 and 96 are ducts; 97 is a conveyor belt; 98 and 99 are heating unit. The hot air discharge from fan 91 is blown into the duct 95 while the hot air from the fan 92 is blown into the duct 96. Further, hot air coming out from one duct is sucked by the other duct to improve the adherence between the photographic paper and the conveyor belt 97. Dampers 94 in the hatched areas 101 and 102 of the figure, move alternately in the directions of arrows to switch the flow direction of hot air so that the suction and discharge sides are isolated. (The same description also applies to the dampers on the other side.)

Apart from the means mentioned above for selecting the emulsion surface, it is possible to produce the same effect in the development and drying processes by having means to selectively turn the photographic paper over after the exposure. The means of turning a photographic paper over is described below using illustrations.

FIGS. 18 and 19 show an embodiment the paper-reversal means for the print and development apparatus of the present invention. FIG. 18 is the case when the photography is 2D and the paper is not turned over. FIG. 19 is the case when the photography is 3D and when the paper is to be turned over. Labels in the figures are: 3 is photographic paper, 11 and 12 are the drive rollers, 21 and 22 are the guide-rollers, 31 is the paper guide, 41 is the drive-motor, 51 is the drive-belt, 52 is the drive-pulley, 60 is the conveyor belt and 80 is the exposure station.

As shown in FIG. 18, the photographic paper 3 carried by the conveyor belt 60 of the exposure station 80 is sent directly in the direction diagonally-down in the case of 2D photographs, enters the paper guide 31; and conveyed by the drive-rollers 11 and 12 and guide-rollers 21 and 22 it goes out of the paper guide 31.

As shown in FIG. 19, in the case of 3D photography the photographic paper 3 is carried by the conveyor belt 60 of the exposure station 80, and the exposure station 80 is rotated 180° about the center of the paper by the rotational motion transmitted to the drive-pulley 52 through the drive-belt 51, which is driven by by the drive-motor 41. The paper 3 is conveyed from this position into the paper guide 31, and has its sides reversed when it is discharged from the paper guide 31 by means of the drive-rollers 11 and 12 and the guide-rollers 21 and 22.

FIGS. 20 and 21 show other embodiments of paper-reversal means for the print and development apparatus of the present invention. FIG. 20 is the case when the photography is 2D and the paper is not revered. FIG. 21 is the case when the photography is 3D and the paper is to be reversed. Labels in the figures are: 3 is the photographic paper; 77 is the suction pump; 11 and 12 are the drive-rollers; 60 is the conveyor belt; 66 is the vertical arm; 67 is the horizontal arm; 78 is the vacuum hose; 79 is the suction pad; 80 is the exposure station.

As shown in FIG. 20, the photographic paper 3 carried by the conveyor belt 60 of the exposure station 80 is sent directly in the direction diagonally-down in the case of 2D photographs, and enters the paper guide 31, and then conveyed by the drive-roller 11 and guide-roller 21 it enters the next paper guide 32, out of which it is carried by the drive-roller 12 and guide-roller 22.

As shown in FIG. 21, the photographic paper 3 carried by the conveyor belt 60 of the exposure station 80 is attracted by the suction pad 79, which functions through the mechanism consisting of the suction pump 77, suction hose 78, vertical arm 66 and horizontal arm 67. Being attracted, the paper 3 is then turned upside down by the rotational motion of the horizontal arm 67 and is laid down on the conveyor belt 60 by the movement of the vertical arm 66. Suction by the suction pad 79 is stopped at this point, and the vertical arm 66 is restored to its original position when the paper has been sent in the direction diagonally up. When the paper 3 is sent diagonally up by the conveyor belt 60, it enters the paper guide 31, and then carried by the drive-roller 11 and guide roller 21, enters the next paper guide 32. Having been transported by the drive-roller 12 and guide-roller 22, the paper 3 comes out of the paper guide 32, with the sides of the paper reversed.

FIGS. 22 and 23 show yet another embodiment of paper-reversal means for the print and development apparatus of the present invention. FIG. 22 is the case when the photography is 2D and the paper is not revered. FIG. 23 is the case when the photography is 3D and the paper is to be reversed. Labels in the figures are: 3 is the photographic paper; 13 and 14 are the drive-rollers; 21, 22, 23 and 24 are the guide rollers; 31 is the paper guide; 60 is the conveyor belt; 68 is a coupling arm; 65 is a drive-drum; and 80 is the exposure station.

As shown in FIG. 22, the photographic paper 3 carried by the conveyor belt 60 of the exposure station 80 is sent directly in the case of 2D photographs by the drive-drum 65 and guide-rollers 21 to the paper guide 31. Further conveyed by the drive roller 13 and guide-rollers 23, it is conveyed out of the paper-guide 31 by means of the drive-roller 14 and the guide-roller 24.

As shown in FIG. 23, in the case of 3D photographs, at the moment when the leading-end of the photographic paper 3 that is carried by the conveyor belt 60 of the exposure station 80 is sandwiched between the drive-drum 65 and guide roller 21, both the paper and the coupling arm 68 are rotated together past the guide roller 22 about the axis of the drive-roller 65 until the leading-end the paper 3 approaches the conveyor belt 60. At this moment, the lagging-end of the paper 3 is sandwiched between the roller 22. If the drive-roller 65 rotates from this position, the paper enters the paper guide 31 from the entrance at right angles to the paper guide. Conveyed by the drive-rollers 13 and 14 and the guide rollers 23 and 24, the paper comes out of the paper guide 31 with the sides of the paper reversed.

FIGS. 24 and 25 show still yet another embodiment of paper-reversal means for the print and development apparatus of the present invention. FIG. 24 is the case when the photography is 2D and the paper is not revered. FIG. 25 is the case when the photography is 3D and the paper is to be reversed. Labels in the figures are: 11, 12 and 13 are drive-rollers; 19 is a processor-roller; 33 is a guide for the exit; 34 is a guide-unit; 35 is a straight guide; 36 is a guide for the entrance to the processor; 37 is a turn-guide; 60 is the conveyor belt; 80 is the exposure station; and 104 is a sensor.

As shown in FIG. 24, when a 2D photographic paper is carried by the conveyor belt 60 of the exposure station 80, the paper passes through the straight guide 35 by means of the drive roller 11 of the exit-guide, enters the processor entrance-guide 36 by means of the drive roller 13 and is transferred to the processor roller 19.

As shown in FIG. 25, when the photographic paper 3 carried by the conveyor belt 60 of the exposure station 80 is 3D, the guide unit 34 is shifted so as to send the paper that is conveyed by the drive-roller 11 into the turn guide 37. The paper, conveyed to the turn-guide 37, is transported further into the turn-guide by the drive-roller 12, and when the lagging end of the paper passes the sensor 104, the drive-rollers 11 and 12 are stopped. Next, by turning the roller 12 in the reverse direction, the paper is sent in the reverse direction up to the drive-roller 13, which inserts the paper with its sides reversed in the processor entrance-guide 36.

FIGS. 26 and 27 show a further embodiment of paper-reversal means for the print and development apparatus of the present invention. FIG. 24 is the case when the photography is 2D and the paper is not revered. FIG. 25 is the case when the photography is 3D and the paper is to be reversed. Labels in the figures are: 11 is a drive-roller; 19 is a processor-roller; 33 is an exit-guide; 36 is a guide for the entrance to the processor; 42 is the paper-inversion motor, 60 is the conveyor belt; 80 is the exposure station; and 104 is a sensor.

As shown in FIG. 26, when a 2D photographic paper is carried by the conveyor belt 60 of the exposure station 80, it directly goes into the exit guide 33, and conveyed further down by the drive-roller 11, it then enters the process-guide inlet 36 to be received by the process-roller 19.

When a 3D photographic paper is carried by the conveyor belt 60 of the exposure station 80, it enters the exit guide 33 as shown in FIG. 26, and is conveyed further down into the guide 33 by the drive-roller 11. When the leading-end of the paper is detected by the sensor 104, the roller 11 is stopped keeping the paper sandwiched between the rollers. In this state, the paper-inversion motor rotates the exit-guide 180° as shown in FIG. 27 to invert the sides of the paper. In this inverted state, the paper is sent to the processor inlet-guide 36 by activation of the roller 11.

In order to be able to accommodate the difference between the processing times of 2D and 3D photography, the conveyor route is changed depending on the type of photography, 2D or 3D. Means are illustrated by which the conveyor route in the developing section of photographic paper is changed.

FIG. 28 is a cross-sectional view of an embodiment of that part where development takes place in the print and development apparatus of the present invention. FIG. 29 shows a schematic diagram of the conveyor belt path and FIG. 30 shows the lever section. Labels in the diagrams are: 38 and 39 are guides; 85 is a rack for circulation; 86 is a lever; and 87 is a solenoid. When the photographic paper is 3D, it is conveyed in the direction of the arrow from rack 1 to rack 2 along the guide 39, which is curved and located at the position shown in FIG. 30. When the photographic paper is 2D, the guide is raised to the position indicated by 38 by the solenoid 87 that raises the lever 86 to the position shown by the dashed line, and the paper, moving along the conveyor path straight, enters the No. 3 rack via the rack 85. From such means as the above, it is possible to accommodate the time differences in the processing.

FIG. 31 is a cross-sectional view of yet another embodiment of that part where development takes place in the print and development apparatus of the present invention and FIG. 32 is the sectional side view of the same part. Labels in the figures are: 38 and 39 are the guides; 47 is a motor; 61, 62 and 63 are gears. When the photographic paper is 3D, it is conveyed in the direction of the arrow from rack 1 to rack 2 along the guide 39, which is curved and located at the position 39. When the photographic paper is 2D, the guide is raised to the position indicated by 38 by the motor 47 that turns the gears 61, 62 and 63, and the paper, moving along the conveyor path straight, enters the No. 3 rack via the rack 85 just as in the previous embodiment.

FIG. 33 is a cross-sectional view of still another embodiment of that part where development takes place in the print and development apparatus of the present invention. In this embodiment, instead of the gears used in the previous embodiment of FIGS. 31 and 32, the motor's motion is transmitted to the guide by a chain or belt 64.

FIG. 34 is a cross-sectional view of still yet another embodiment of that part where development takes place in the print and development apparatus of the present invention and FIG. 35 is the schematic side view of the same part. Labels in the figures are: 25, 26, 27, 28, 29 and 30 are the rollers; 88 is the lane for 2D conveyor; and 89 is the lane for 3D conveyor. Conveyor lanes are divided into two lanes: the lane 88 that is for 2D and that carries papers from No. 1 to No. 3 along the path, 25–27–28–26; and the lane 89 that is for 3D and that carries papers from No. 1 to No. 2 to No. 3 along the path, 25–29–30–26. These two lanes are contained in a single casing or a rack and can accommodate the aforementioned processing time differences.

In order to adjust the positions of lenses for the printing of 3D photography, lenses for 3D and 2D photography are mounted on a plate that is equipped with a mechanism for lens position adjustment. This mechanism makes it possible to realize printing of conventional photographs, switching to printing of 3D photographs and attaining a desired photographic angle. Illustrated in the following embodiments are the means for the lens adjustment.

FIG. 36 is a diagram showing one embodiment of the means for adjusting the positions of lenses of the print and development apparatus of the present invention. Labels in the figure are: 7 is a camera detecting negatives; 8 is 2D lens; 9 is 3D lens; 46 is a motor; 48 is a 2D lens-plate; 49 is a 3D lens-plate; 58 are a stationary block; 59 is a feed screw; 69 is a linear rail.

Fixed on the 3D lens-plate 49 are the 3D lens 9 and the camera 7 for detecting negatives. 3D lens-plate 49 is kept on the linear rails 69 and the two stationary block 58 attached to the plate, hold the feed screw 59 in place.

The 2D lens 8 is fixed on the 2D lens-plate 48. When the 2D lens is to be used, the 2D lens-plate remains secured in its appropriate position while the 3D lens-plate is pushed aside to the position shown by the dashed lines in the figure by activating the motor 46 and transmitting that motion to 3D lens-plate via the feed screw 59. When the 3D lens is to be used, the 3D lens-plate is moved so that the desired photographic angle can be chosen.

FIG. 37 is a diagram showing another embodiment of the means for adjusting the positions of lenses of the print and development apparatus of the present invention. Labels in the figure are: 7 is a camera detecting negatives; 8 is 2D lens; 9 is 3D lens; 46 is a motor; 48 is a 2D lens-plate; 49 is a 3D lens-plate; 53 is a feed belt, 58 are stationary blocks; and 69 is a linear rail.

Fixed on the 3D lens-plate 49 are the 3D lens 9 and the camera 7 for detecting the negatives. 3D lens-plate 49 is laid on the linear rails 69 and the feed belt 53 are attached to the plate by the two stationary blocks 58. The 2D lens 8 is fixed on the 2D lens-plate 48. When the 2D lens is to be used, the 2D lens-plate remains secured at its appropriate position while the 3D lens-plate is pushed aside to the position shown by the dashed lines in the figure by activating the motor 46 and transmitting that motion to 3D lens-plate via the feed belt 53. When the 3D lens is to be used, the 3D lens-plate is moved so that the desired photographic angle can be chosen.

FIG. 38 is a diagram showing yet another embodiment of the means for adjusting the positions of lenses of the print and development apparatus of the present invention. Labels in the figure are: 7 is a camera detecting negatives; 8 is 2D lens; 9 is 3D lens; 46 is a motor; 48 is 2D lens-plate; 49 is 3D lens-plate; 54 is a rack-and-pinion, and 69 is a linear rail.

Fixed on the 3D lens-plate 49 are the 3D lens 9 and the camera 7 for detecting negatives. 3D lens-plate 49 is laid on the linear rails 69, and a rack-and-pinion mechanism 54 is formed from a feed-dog machined on one side of the 3D lens-plate 49 and a pinion wheel that is attached to the motor 46 and activated by the motor. The 2D lens 8 is fixed on the 2D lens-plate 48. When the 2D lens is to be used, the 2D lens-plate remains secured in its appropriate position while the 3D lens-plate is pushed to the position shown by the dashed lines in the figure 38 by activating the motor 46 and transmitting that motion to 3D lens-plate via the rack and pinion mechanism 54. When the 3D lens is to be used, the 3D lens-plate is moved so that the desired photographic angle can be chosen.

FIG. 39 is a diagram showing still yet another embodiment of the means for adjusting the positions of lenses of the print and development apparatus of the present invention. Labels in the figure are: 7 is a camera detecting negatives; 8 is 2D lens; 9 is 3D lens; 46 is a motor; 48 is 2D lens-plate; 49 is 3D lens-plate; 55 is an actuating arm; 58 is a fixing member; and 69 is a linear rail.

Fixed on the 3D lens-plate 49 are the 3D lens 9 and the camera 7 for detecting negatives. 3D lens-plate 49 is laid on the linear rails 69, and attached to one corner of this 3D lens-plate with sufficient lubrication is the actuating arm 55, the other end of which being fixed to the axis of the motor 46. The 2D lens 8 is fixed on the 2D lens-plate 48. When the 2D lens is to be used, the 2D lens-plate remains secured at its appropriate position while the 3D lens-plate is pushed aside to the position shown by the dashed lines in the figure by activating the motor 46, which turns actuating arm 55 about the axis of rotation of the motor. When the 3D lens is to be used, the 3D lens-plate is moved so that the desired photographic angle can be chosen.

With regard to the case when a suction-type exposure station is used, the mechanism by which the adhesive strength is changed in the case of conventional and 3D photography is described below in the following order.

FIG. 40 is a diagrammatical representation of the cross-sectional view of the suction type exposure-station. Labels in the figure are: 44 is the conveyor motor; 56 is a slave-pulley; 57 is the live-pulley; 60 is the conveyor-belt; 71 is the suction plate; 72 is the suction cell; 73 is the suction fan; 74 is the duct. This arrangement of the exposure station is such that the suction-fan 73 produces a suction force on the photographic paper so as to adhere it on the conveyor belt 60 by suction of air through many small holes on the wide conveyor belt 60 in the region between the live-pulley 57 and the slave-pulley 56. The suction plate 71 preserves the flatness of the conveyor belt 60 in the exposure section, and the suction cell 72, on the other hand, distributes the suction force of the suction fan over the entire surface of the exposure-section. Component 74 is the duct that connects those two components.

FIGS. (1) to (4) of FIG. 41 is one schematic representation of conveyance means of photographic papers in the suction-type exposure station. Labels in the figure are: 4 is the photographic paper roll; 15 are exit-rollers; 20 is the live-roller; 60 is the conveyor belt; 70 is the slide shaft; 80 is exposure-station; 110 is a cutter. As shown (1) of these figures, to begin with, the leading end of the paper is on stand-by at the cutter 110. As in (2), when the live-roller 20 is driven to feed a fixed length of paper, the cutter 110 is actuated and the paper is cut. Being sucked by the conveyor belt 60, the cut paper is then conveyed to the exposure position, where it stops. At this stationary position as shown in (3), exposure takes place while the exposure station 80 as a whole slides along its sliding shaft 70. Once the exposure is finished as shown in (4), the paper is again conveyed by the conveyor belt 60 up to the exit roller 15.

Once the paper is cut by the cutter for a fixed length, the paper, being adhered to the conveyor belt 60 is conveyed by the conveyor belt to the exposure position by functioning the conveyor motor. When the exposure has taken place, the paper is again conveyed by the function of the conveyor motor up to the exit roller. Depending on the thickness of the photographic paper, the strength of adherence between the paper and the conveyor belt has to be changed. In order that this adhesive strength be changed, such means as the following can be considered: varying the supply-voltage to the suction fan that supply the suction force; and varying the amount of air sucked.

The means for varying the adhesive strength on photographic paper in the suction-type exposure station are described below with illustrations. FIG. 42 shows one embodiment of the means for varying the adhesive strength in the suction-type exposure station of the present invention. Labels in the figure are: 1 is power supply section; 73 is the suction fan; 75 is the surface where the suction occurs; 76 is the suction hose; 80 is the exposure station. Produced by the suction-fan 73, a negative pressure is transmitted via the suction-hose 76 and acts at numerous small holes on the suction-surface 75 of the exposure station 80. The strength of the suction is varied by changing the supply voltage to suction fan 73 from the power supply 1.

FIG. 43 shows in a cutaway view another embodiment of the means for varying the adhesive strength in the suction-type exposure station of present invention. Labels in the figure are: 75 is the surface where the suction occurs; 76 is the suction hose; 80 is the exposure station; 105 is air control flap; 106 is the air-control solenoid. For photographic papers needing stronger adhesion, the air-control solenoid 106 is turned-on to pull out the air-control flap and keep it at the position shown by flap position 49 making the area of the air-passage wider. When the adhesion needs to be weaker, the size of the air-passage is reduced by turning off the air-control solenoid 106 and letting the air-control flap return in the direction of arrow to the position shown by thin lines. This embodiment is one that where the strength of adhesion is varied by changing the size of the air-passage.

FIG. 44 shows in a cutaway perspective view yet another embodiment of the means for varying the adhesive strength in the suction-type exposure station of present invention, and FIG. 45 is an enlarged side view of the solenoid. Labels in the figure are: 72 is the suction cell; 75 is the surface where the suction occurs; 76 is the suction hose; 107 is the solenoid; 108 is the movable member of the solenoid; and 109 is a member preserving air-tightness.

When the adhesive strength needs to be stronger, the solenoid 107 is turned off and the movable member 108 is made free to move. Attracted to the suction cell 72 because of the vacuum produced in the cell by the suction fan, the movable member 108 of the solenoid seals the suction cell 72. When the strength of the adhesion is to be reduced, the solenoid 107 is turned on. Then the movable member 108 of the solenoid gets attached to the solenoid 107, the suction cell 72 opens and controls the adhesion by keeping the negative pressure below a certain value. This embodiment is one that where the strength of adhesion is controlled by restraining the vacuum build-up within the suction-cell by means of a solenoid being turned on and off.

The means for improving the performance of 3D photography processing are explained below. The fact that the exposure station is movable makes it possible to allocate into more than 2 lanes the photographic paper that is being fed by the live-roller. Although the processing speed in 3D photography is slower compared to the processing of conventional photography, the processing performance can be improved by allocating the photographic paper into more than two lanes.

Moreover, by machining a circumferential groove on the rollers such as those of the exposure station, contact of a roller with the trademark letters on the backside of conventional photographs is avoided. When being dealt with of 3D photographic processing, on the other hand, the circumferential groove will come into contact with the emulsion surface of the photographic paper leaving a possibility for the photograph to be damaged. As for the present invention, it will be just enough to displace the exposure station and convey the 3D photographic paper avoiding the groove on the roller.

FIG. 46 is an illustration of how the process-lanes can be changed in the exposure station of the print and development apparatus of present invention. Labels in the figure are: 16 is the feed-in roller; 17 is the feed-out roller; 45 is a motor; 50 is the slide thread; 58 is a stationary block; 60 is the conveyor belt; 70 is the slide rollers; 80 is the exposure station. Exposure station is mounted on the slide-shaft by means of the conveyor belt 60 and is fixed in place by the slide thread 50 and the stationary block 58. The photographic paper being fed by the feed-in roller 16 is conveyed in the direction B and is fed out of the exposure station by the feed-out roller 17. Additionally, since the exposure station 80 can be moved in the direction A, it will be possible for the paper to be carried over to another lane (or even to more lanes) as shown in the figure by the position indicated by the dashed-lines and be fed out of the exposure station.

Because of the fact that the photographic paper can be carried over to numerous lanes using a method such as the above, exposure is done having the position of the exposure station changed, and the movability of the exposure station is then utilized to allocate the papers to two lanes when the paper is to be sent to the processor, thereby avoiding the performance deteriorations in 3D photographic processing.

Although in conventional photography trade mark letters on the backside of a printing paper are harmful for the print quality but can be avoided by machining a groove on the roller 17 as shown in the figure, in 3D photography the groove spoils the emulsion surface and thus the print quality. In the present invention, by moving the exposure station aside the paper can be fed so as to avoid the groove, and the print quality will not deteriorate. Although the present embodiment uses a slide thread for moving the exposure station, it can also accommodate a belt system or rack and pinion system. Moreover, instead of a slide roller it can use a liner-rail.

BRIEF DESCRIPTION OF THE DRAWINGS

FIGS. 3, 6, 9, 12 and 15 are the sectional side views; FIGS. 4, 7, 10, 13 and 16 are the sectional plan views; FIGS. 5, 8, 11, 14 and 17 are the frontal views. FIGS. 18, 20, 22, 24 and 26 are the case when the photography is 2D and the paper is not revered; FIGS. 19, 21, 23, 25, and 27 are the case when the photography is 3D and the paper is reversed. FIG. 41 is a schematic representation of the conveyance means of photographic papers in the suction-type exposure station; FIGS. 42 to 44 show an embodiment of the means for varying the adhesive strength in the suction-type exposure station of the present invention; FIG. 45 is an enlarged side view of a solenoid of that embodiment.

DETAILED DESCRIPTION OF THE PREFERRED EMBODIMENTS

Figure 1:
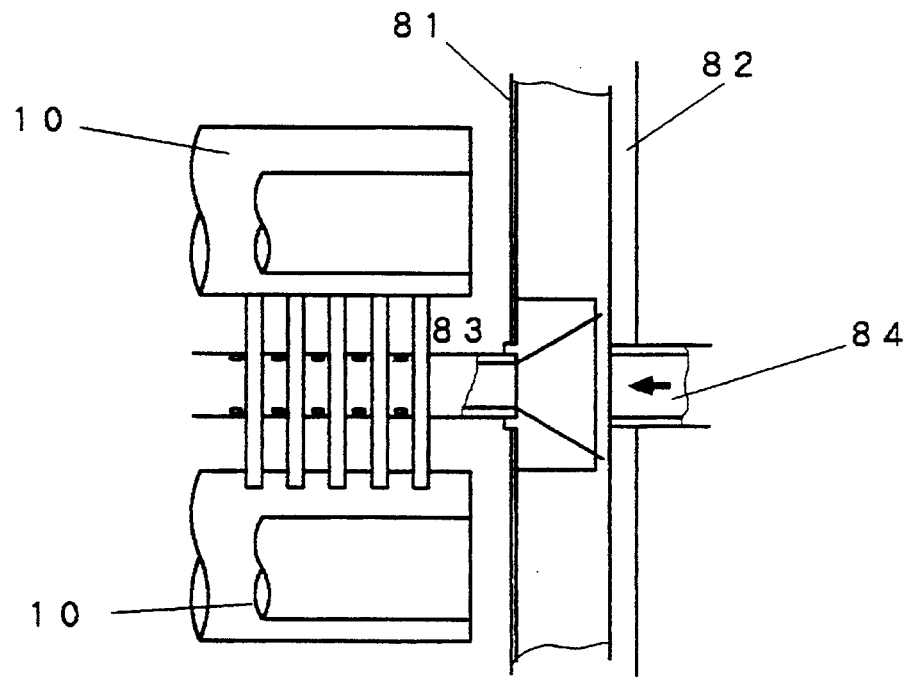
FIG. 1 is the lengthwise sectional view of the development section of the print and development apparatus of the present invention and FIG. 2 is the cross-sectional view of that development section.
Figure 2:
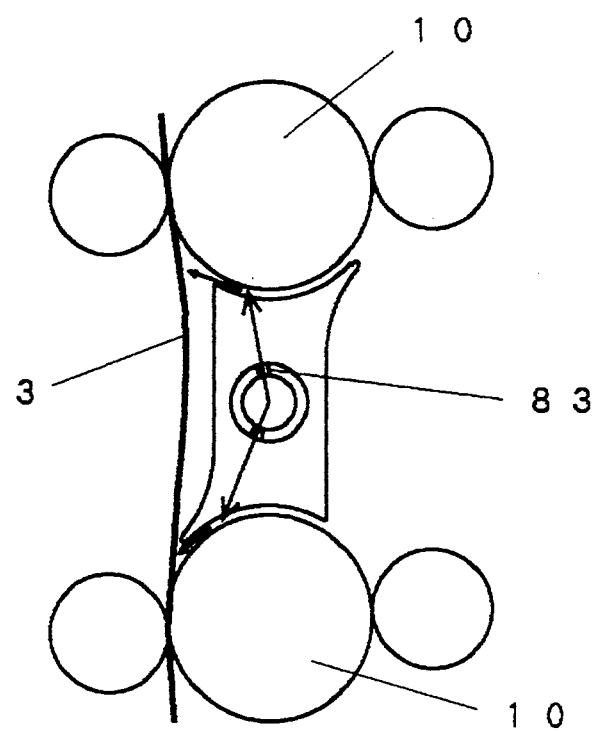
Figure 3:
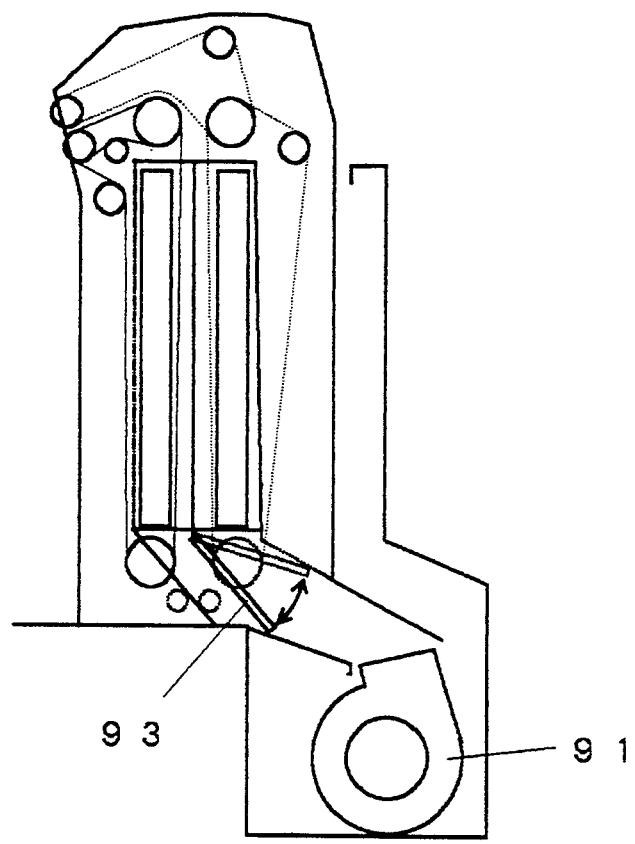
FIGS. 3 to 17 show an embodiment of the dryer portion of the print and development apparatus of the present invention, where
Figure 4:
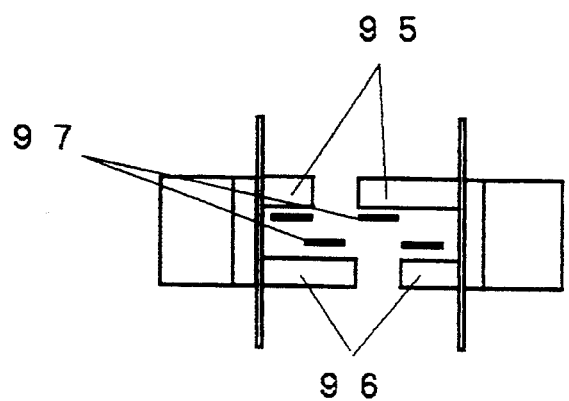
Figure 5:
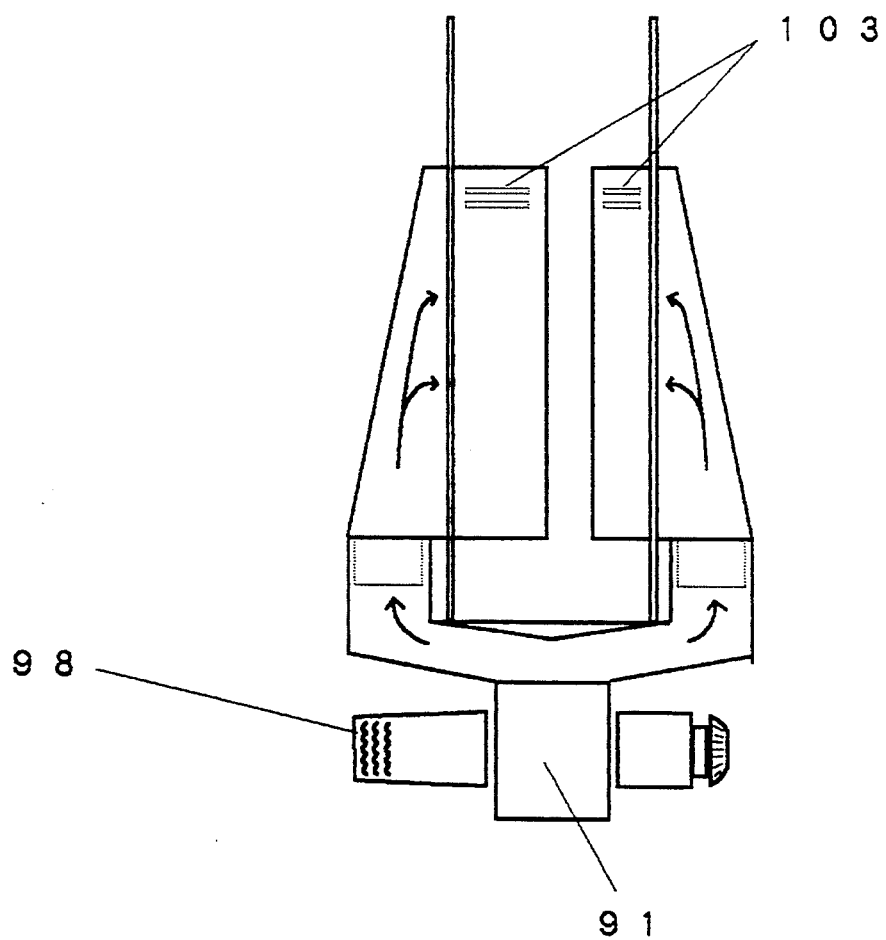
Figure 6:
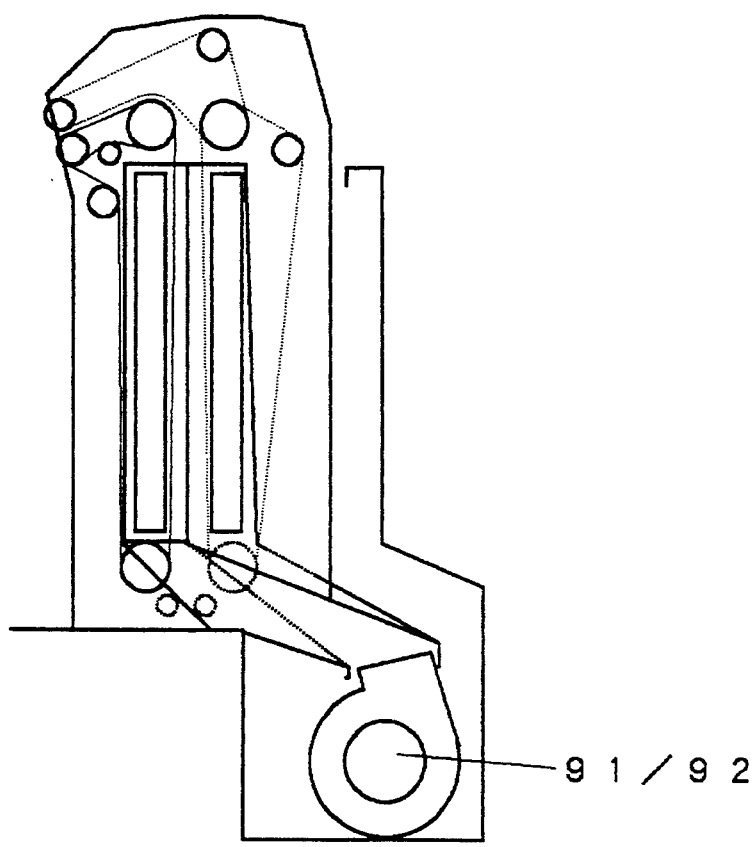
Figure 7:
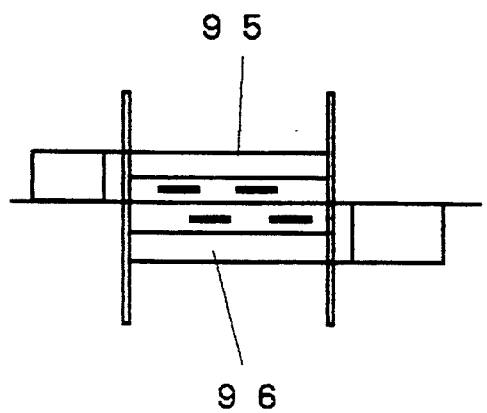
Figure 8:
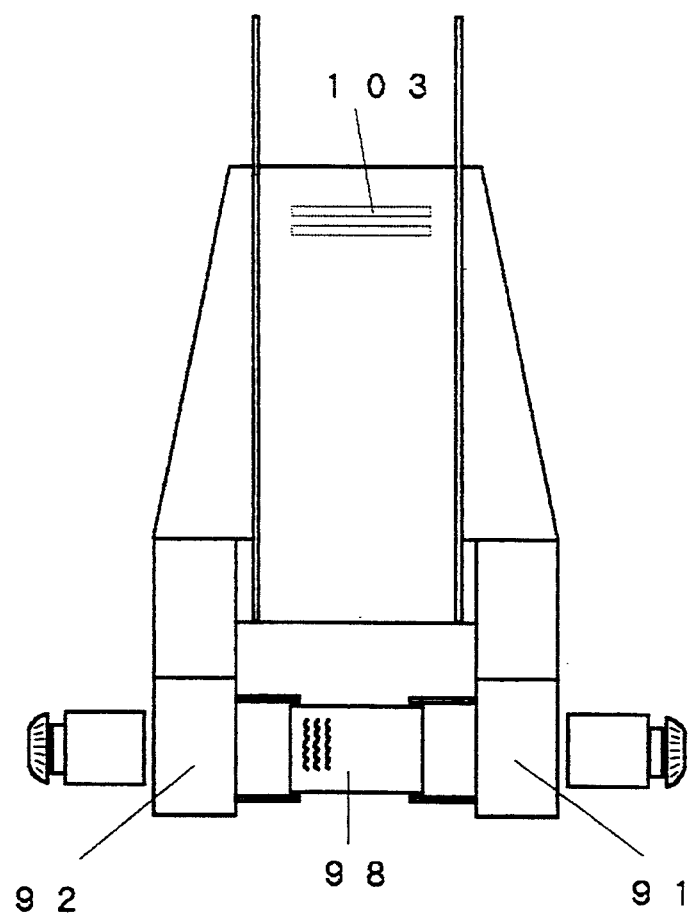
Figure 9:
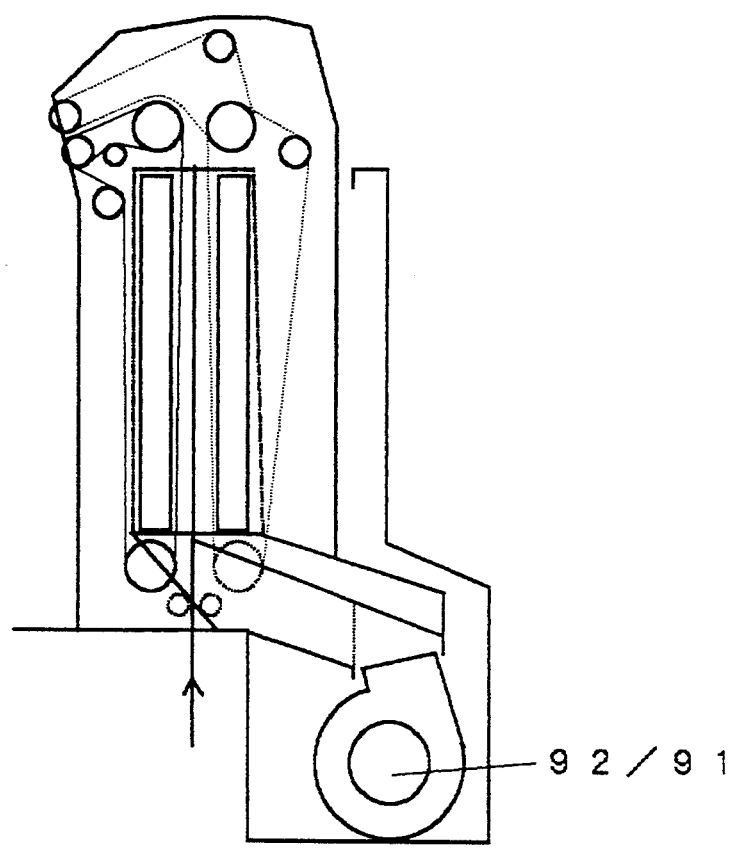
Figure 10:
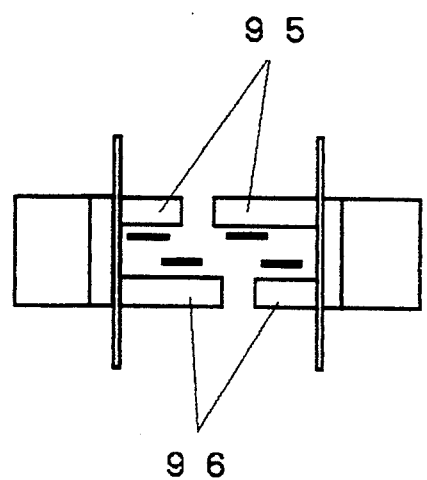
Figure 11:
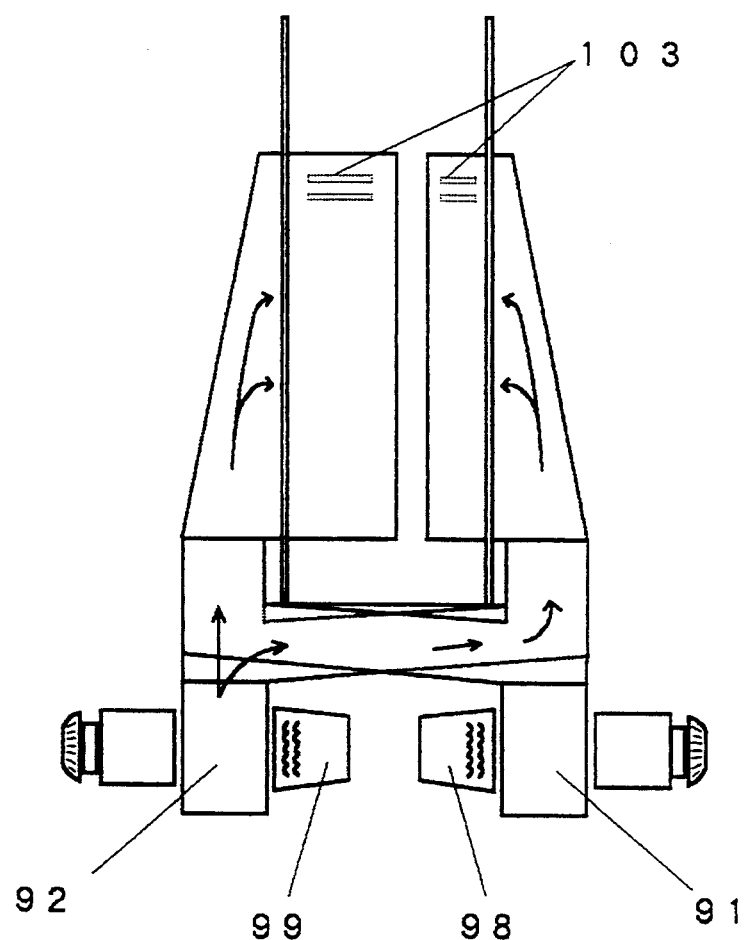
Figure 12:
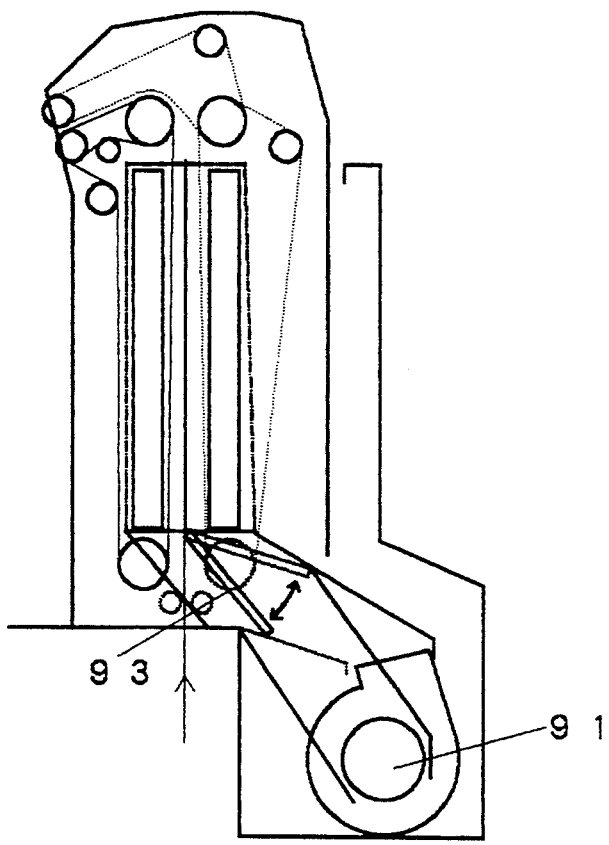
Figure 13:
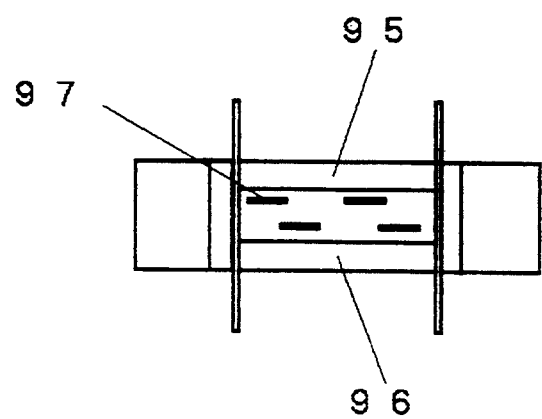
Figure 14:
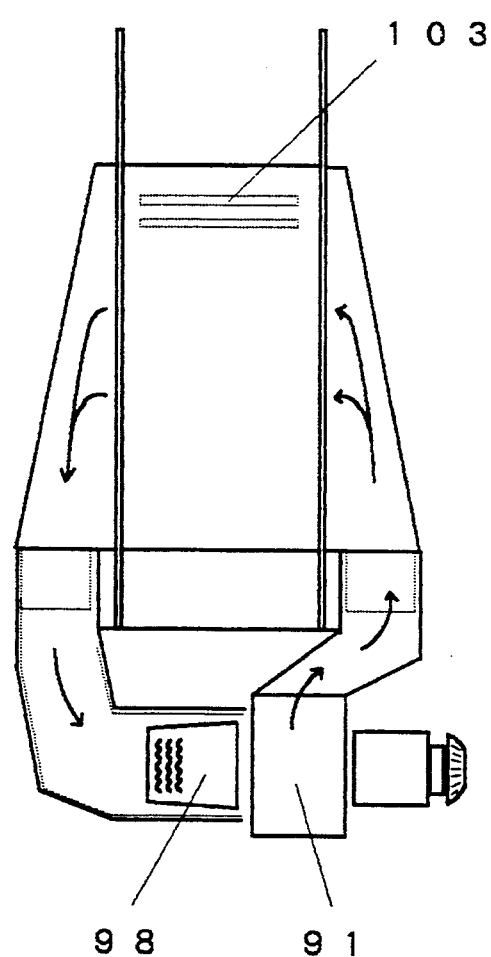
Figure 15:
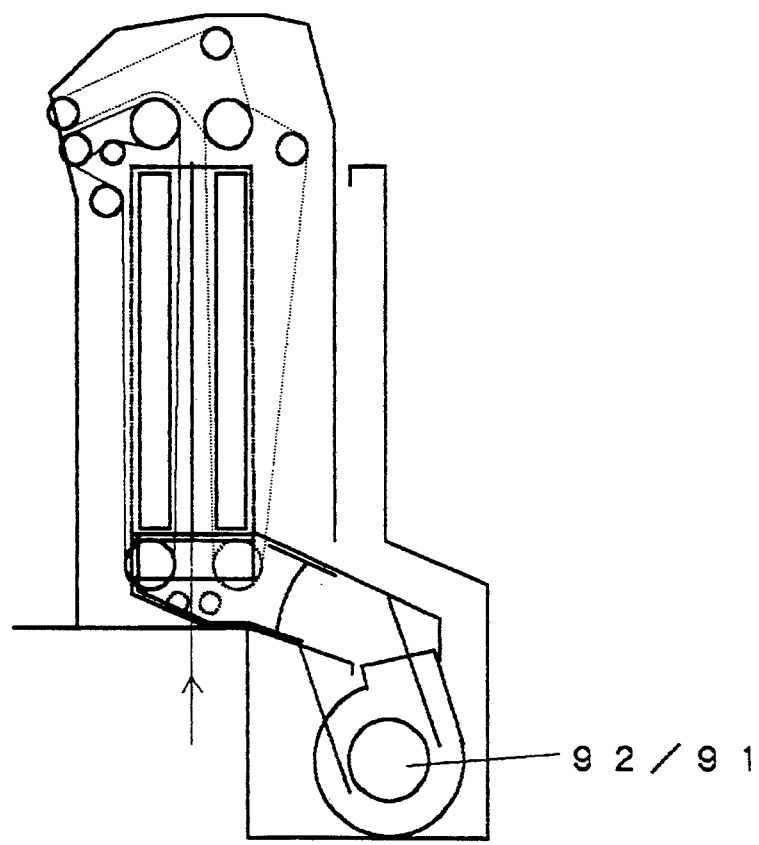
Figure 16:
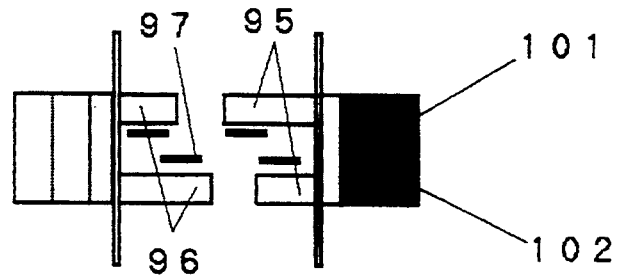
Figure 17:
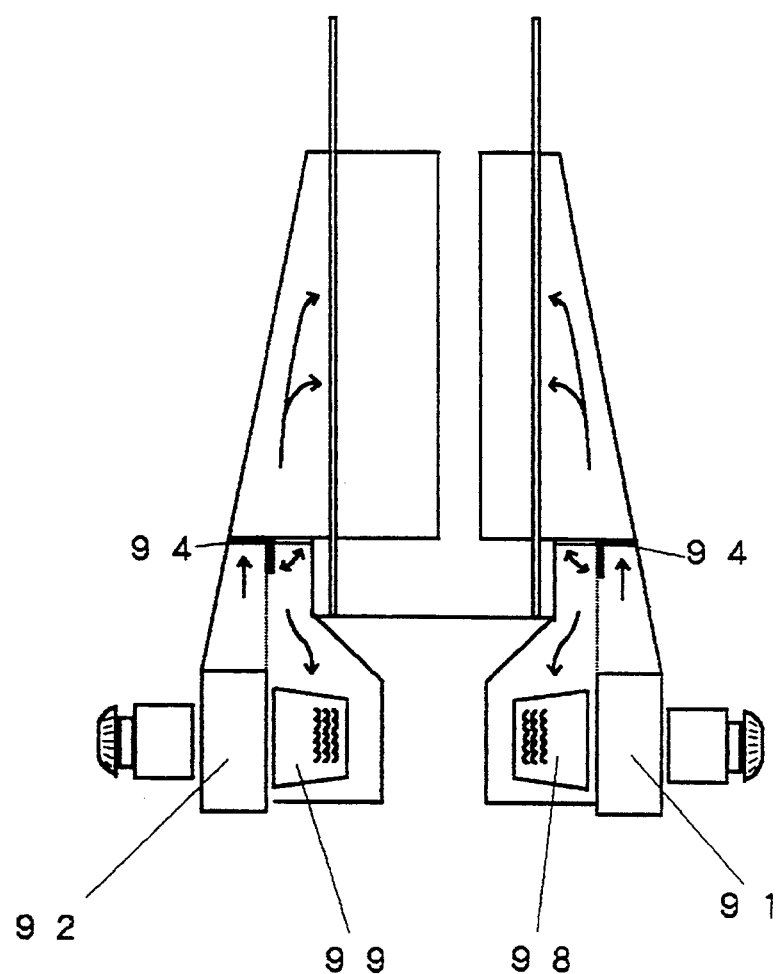
Figure 18:
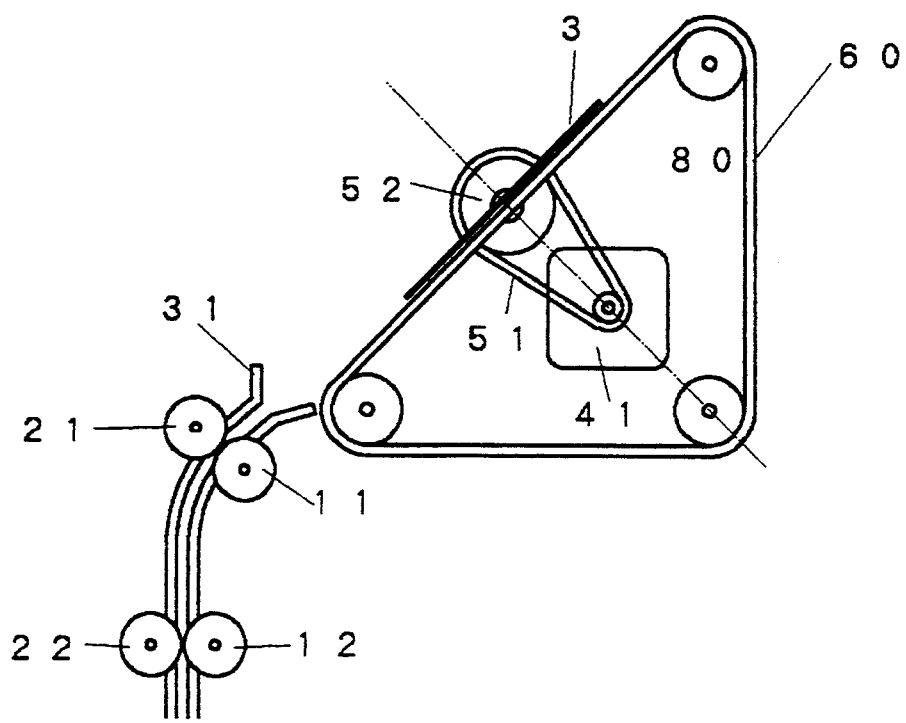
FIGS. 18 to 27 show embodiments for paper-reversal means for the print and development apparatus of the present invention, where
Figure 19:
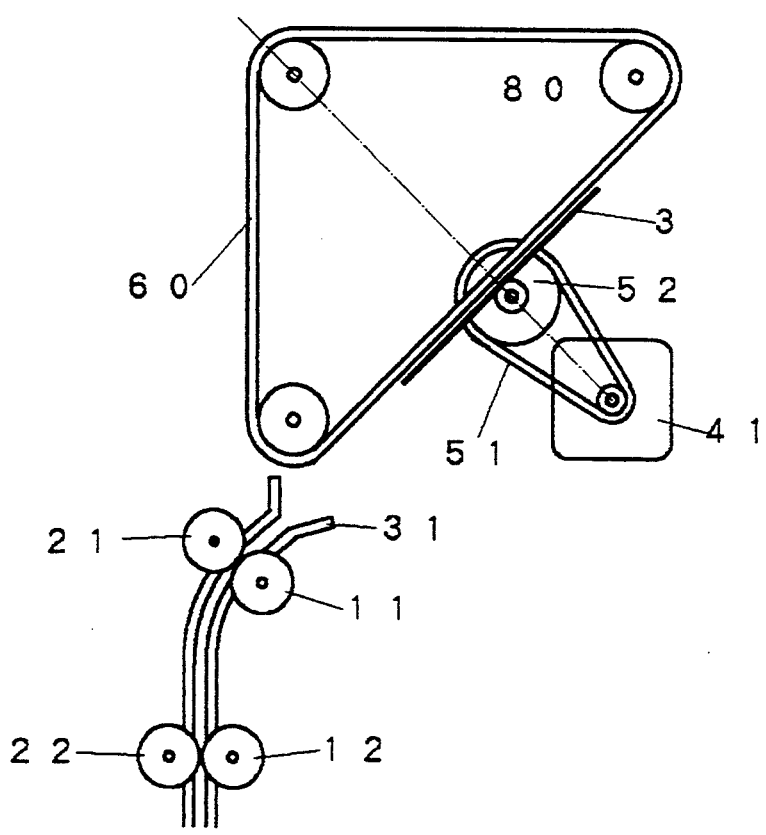
Figure 20:
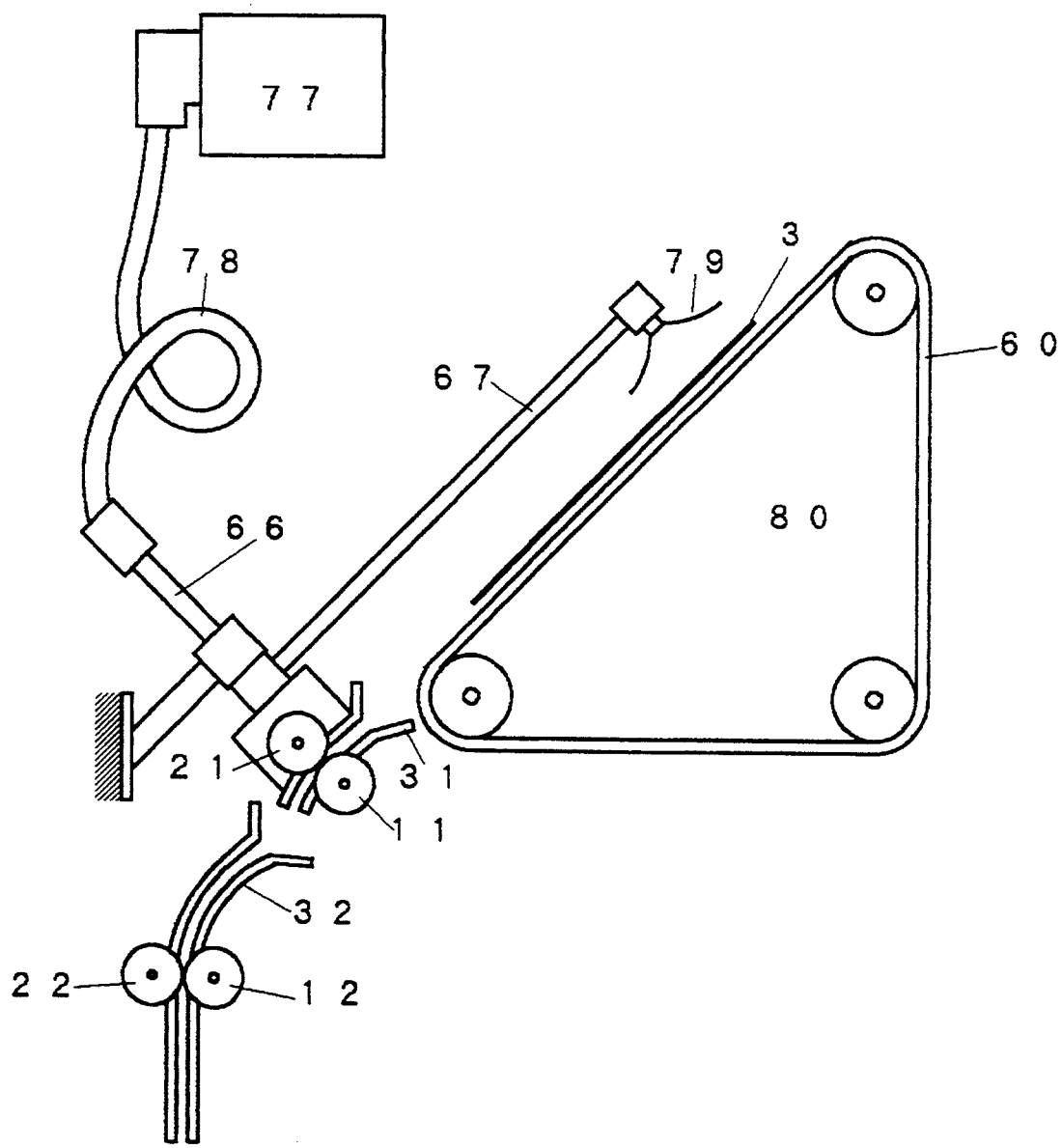
Figure 21:
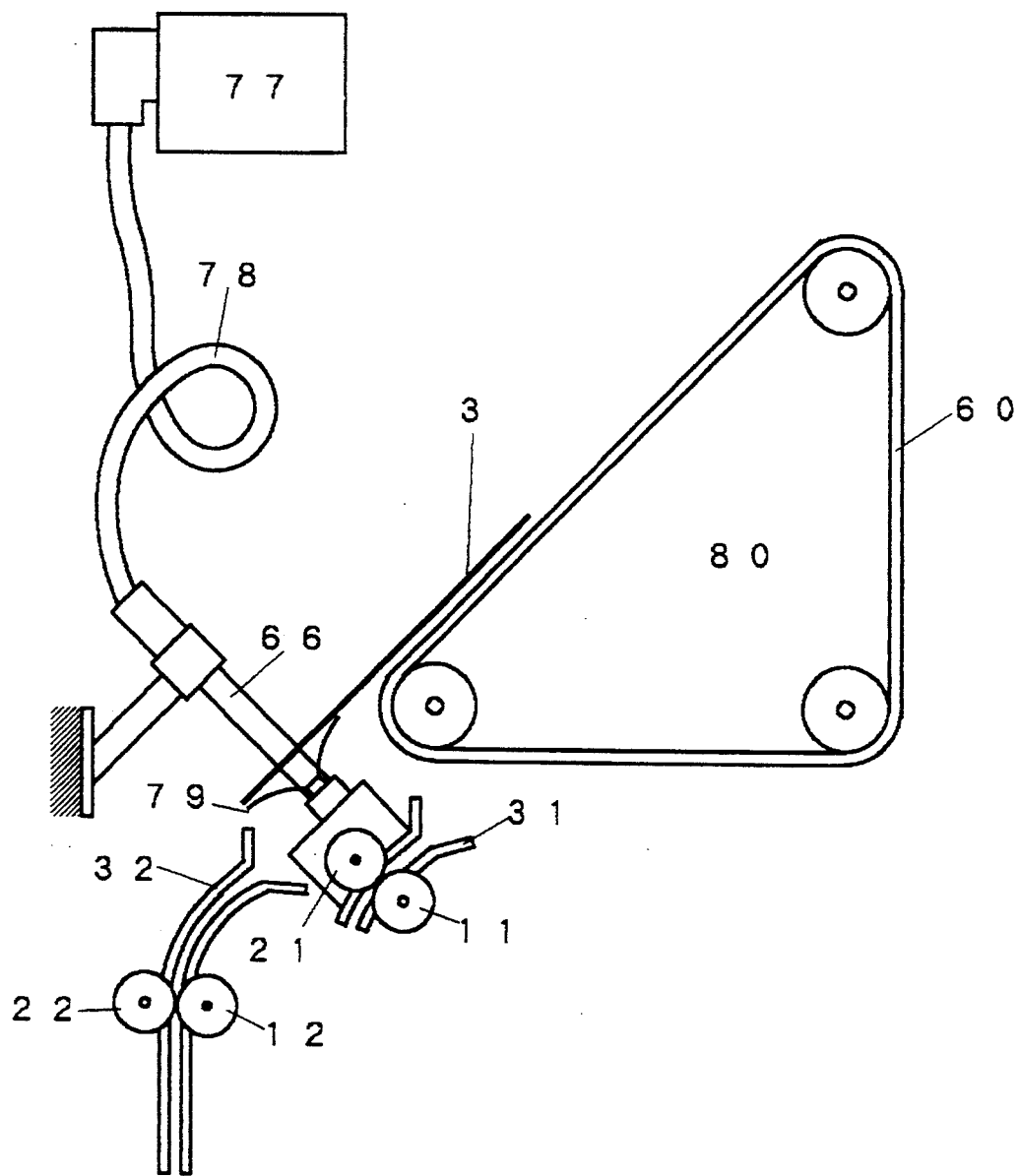
Figure 22:
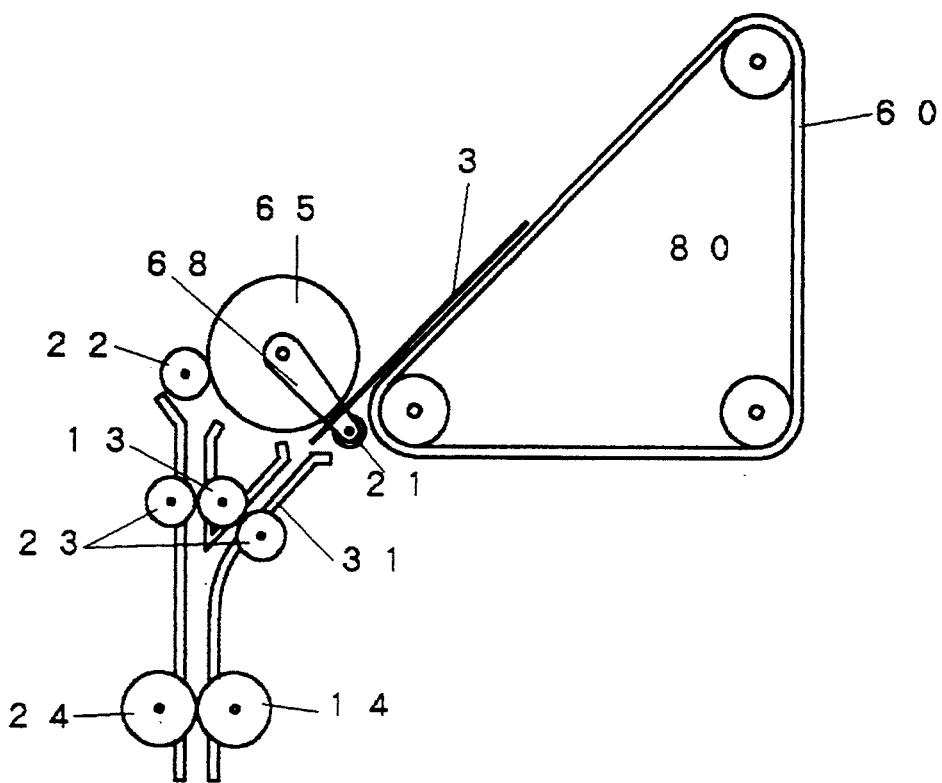
Figure 23:
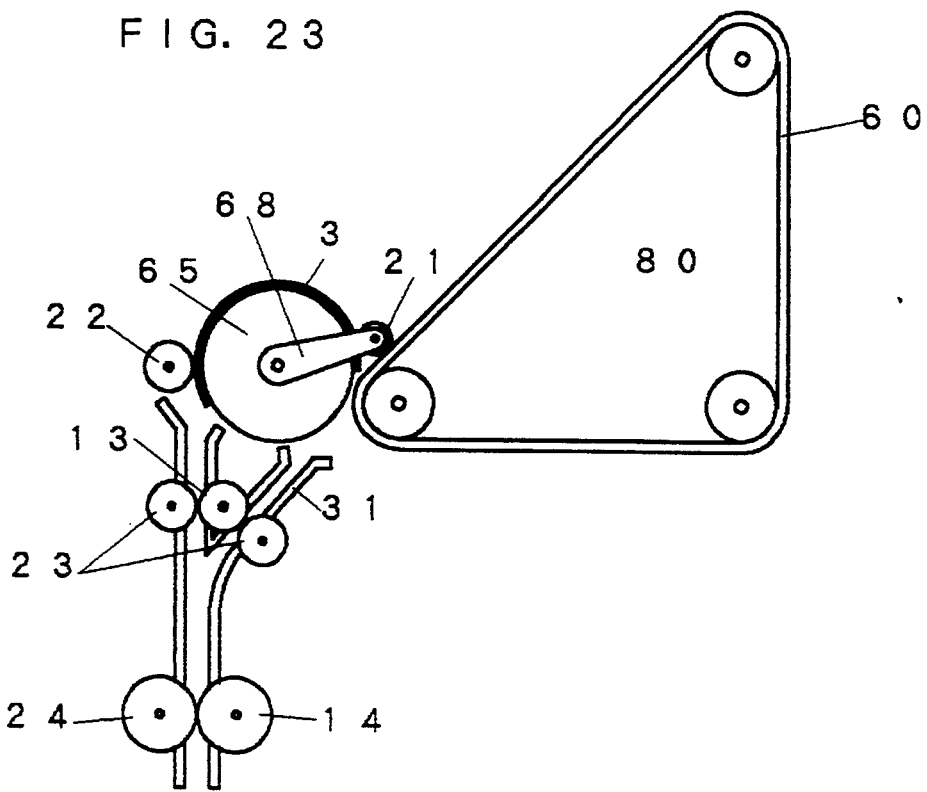
Figure 24:
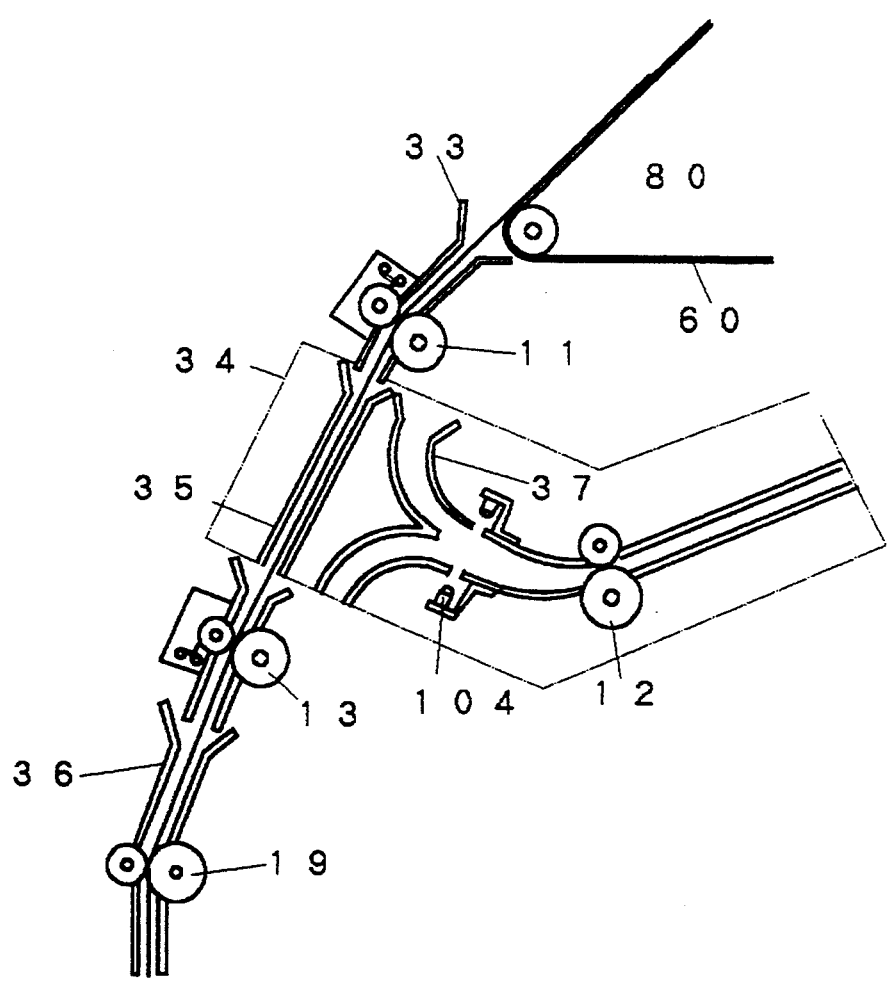
Figure 25:
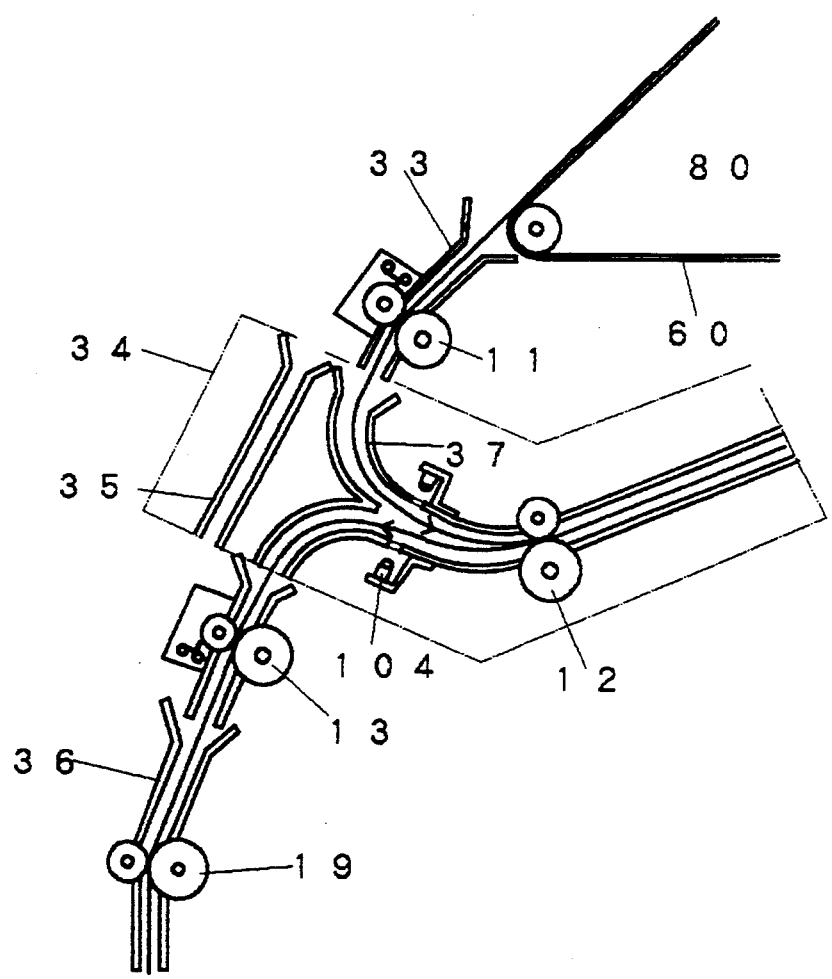
Figure 26:
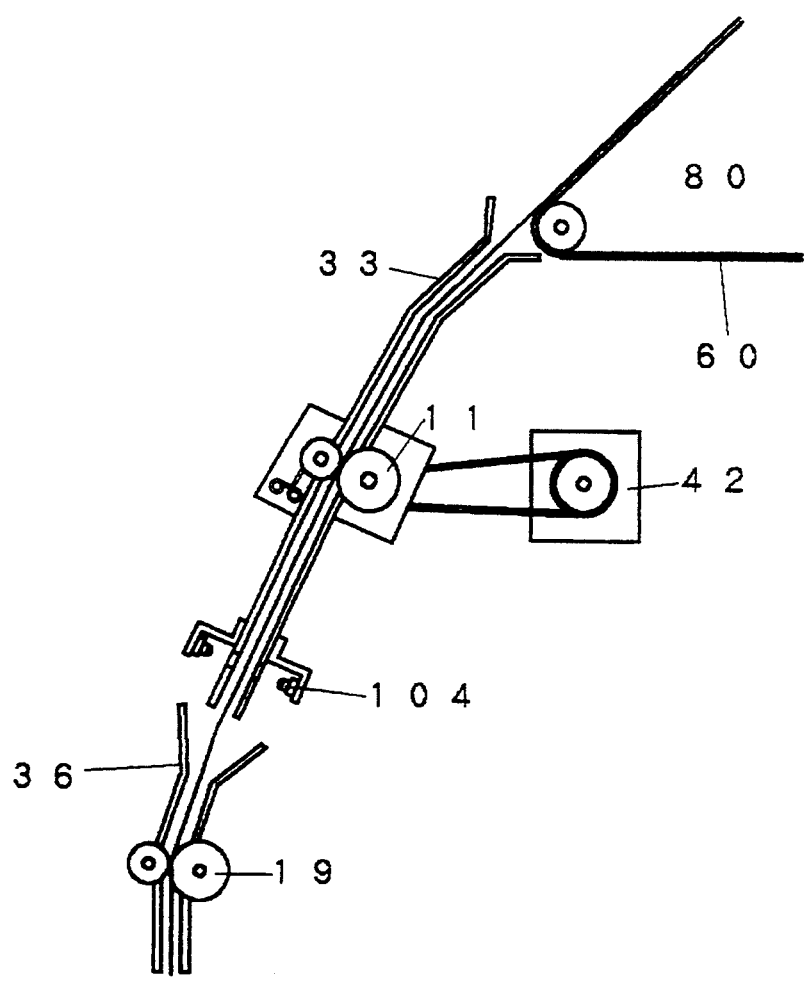
Figure 27:
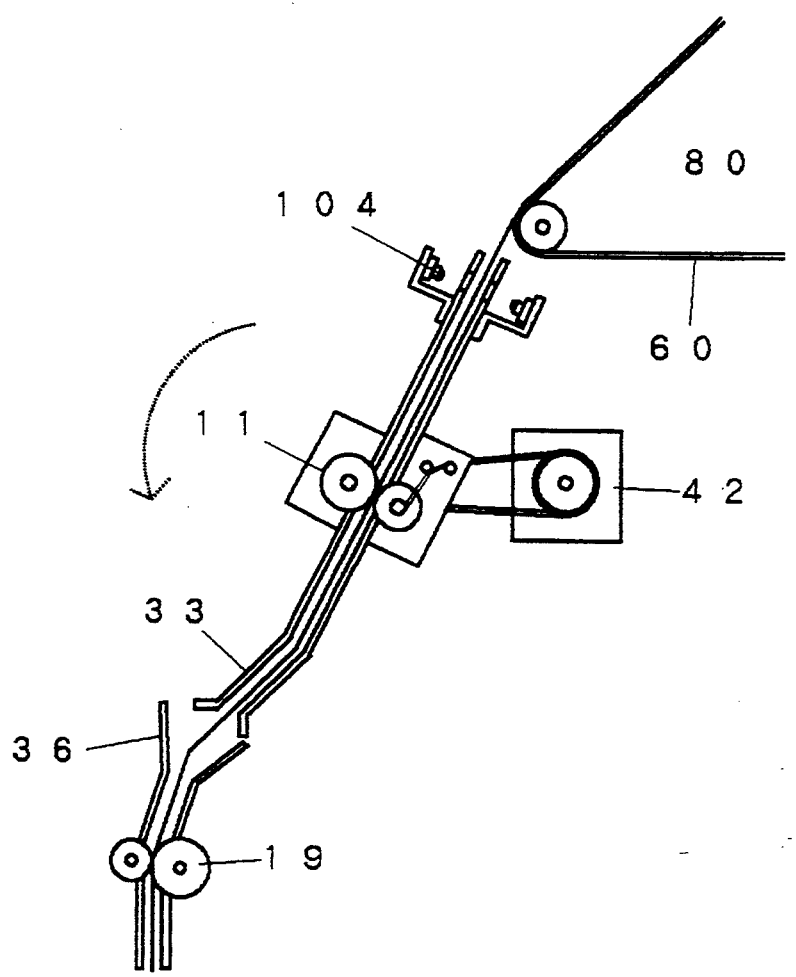
Figure 28:
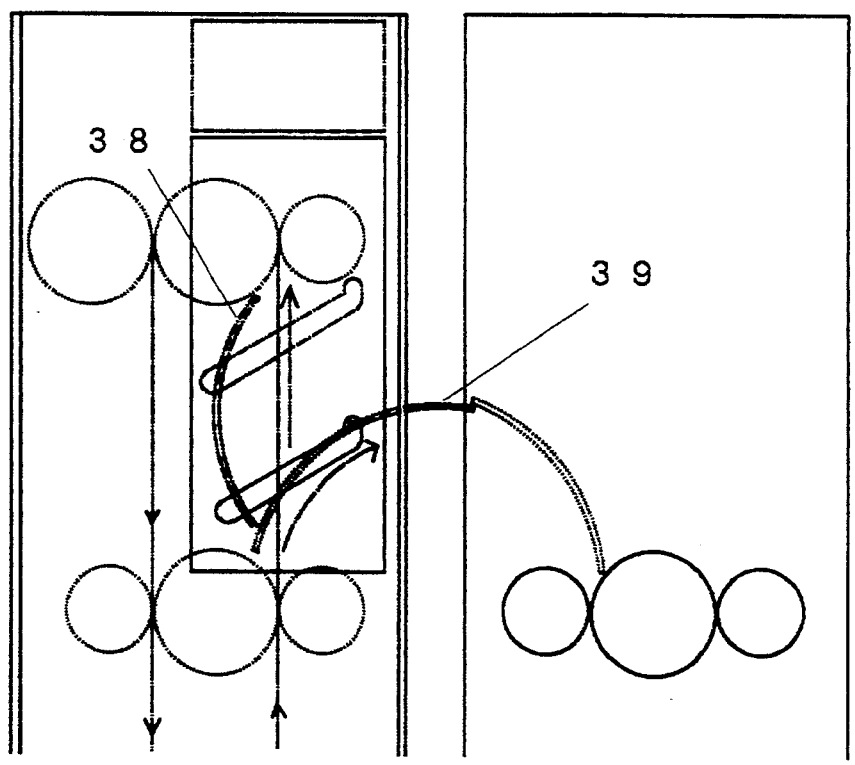
FIG. 28 show in cross-sectional view an embodiment of the development section of the the print and development apparatus of the present invention.
Figure 29:
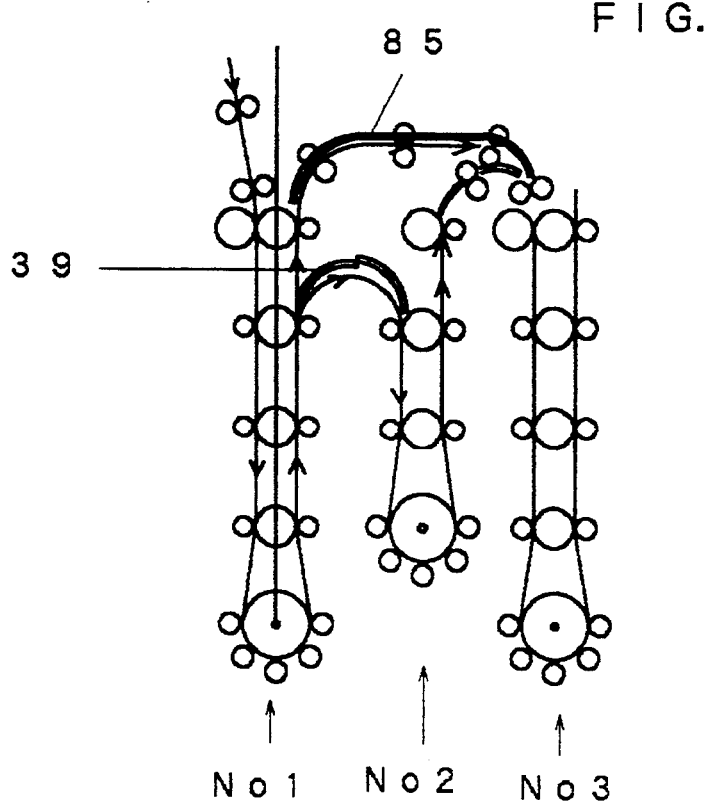
FIG. 29 is a schematic diagram of the conveyor belt path.
Figure 30:
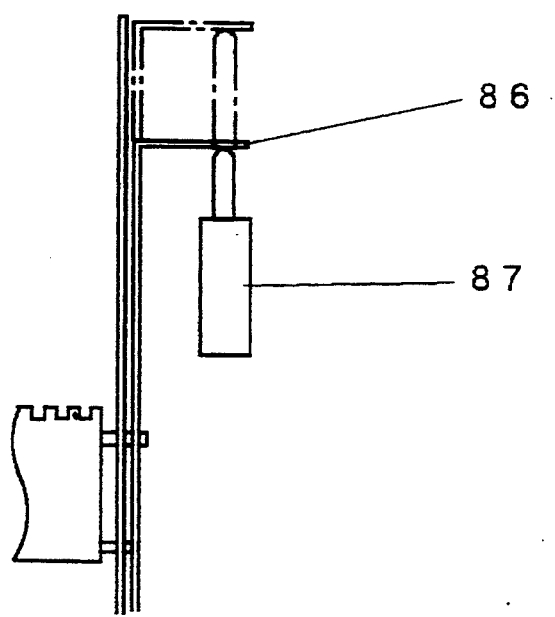
FIG. 30 is a schematic diagram of the lever section.
Figure 31:
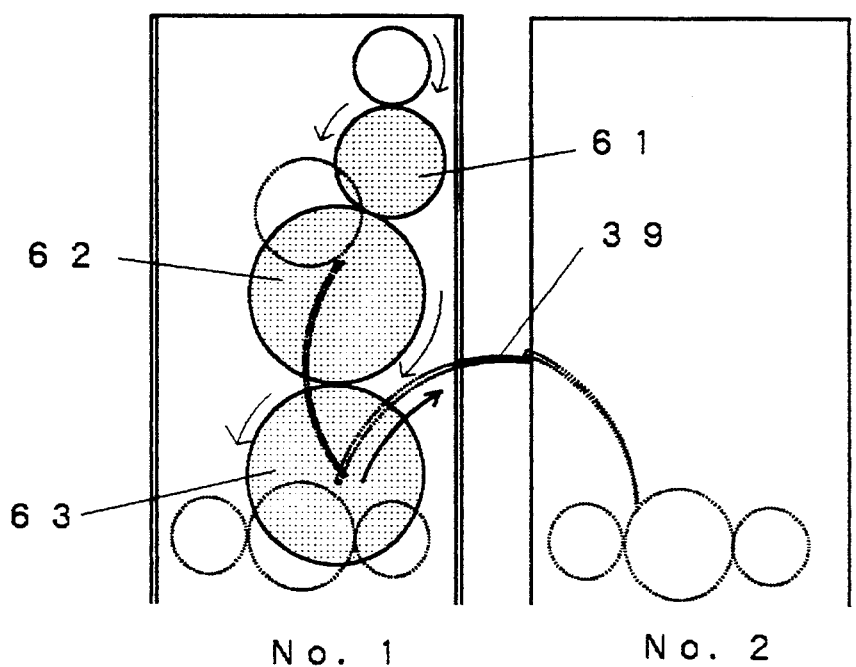
FIG. 31 shows in a cross-sectional view an embodiment of development section in the print and development apparatus of the present invention and FIG. 32 shows a schematic side view of the development section.
Figure 32:
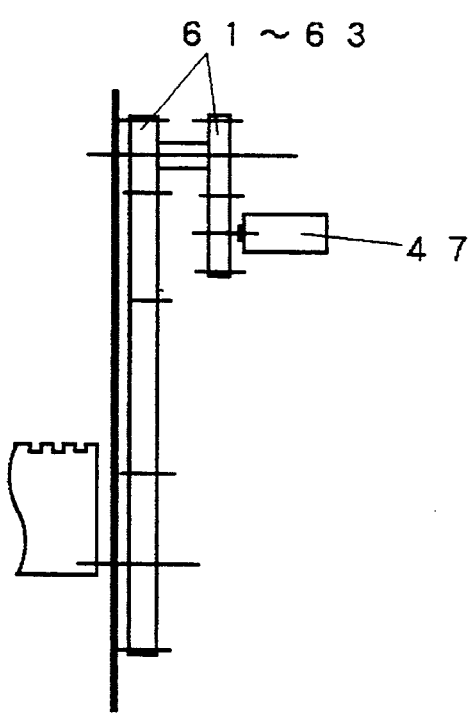
Figure 33:
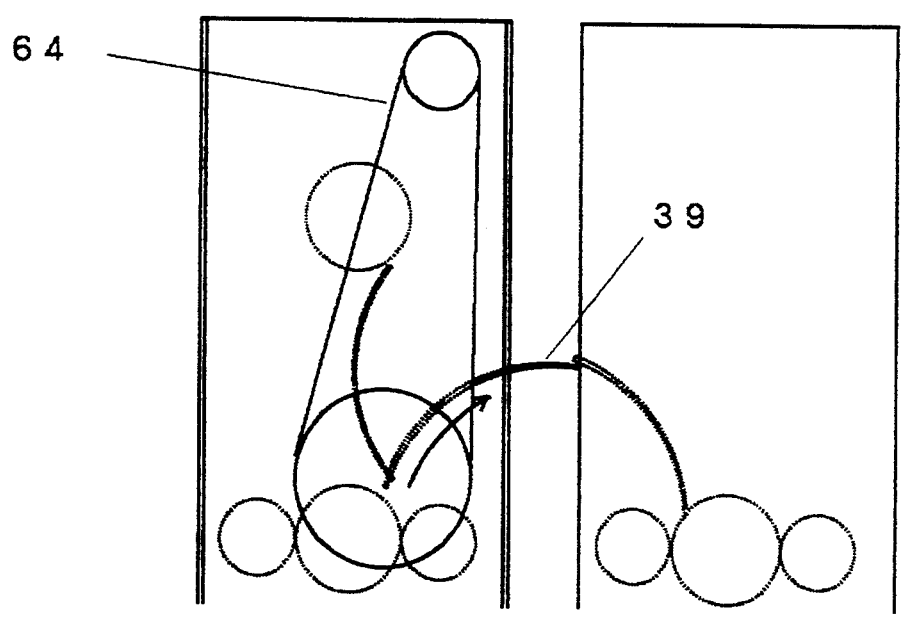
FIG. 33 shows in a cross-sectional view another embodiment of the development section of the print and development apparatus of the present invention.
Figure 34:
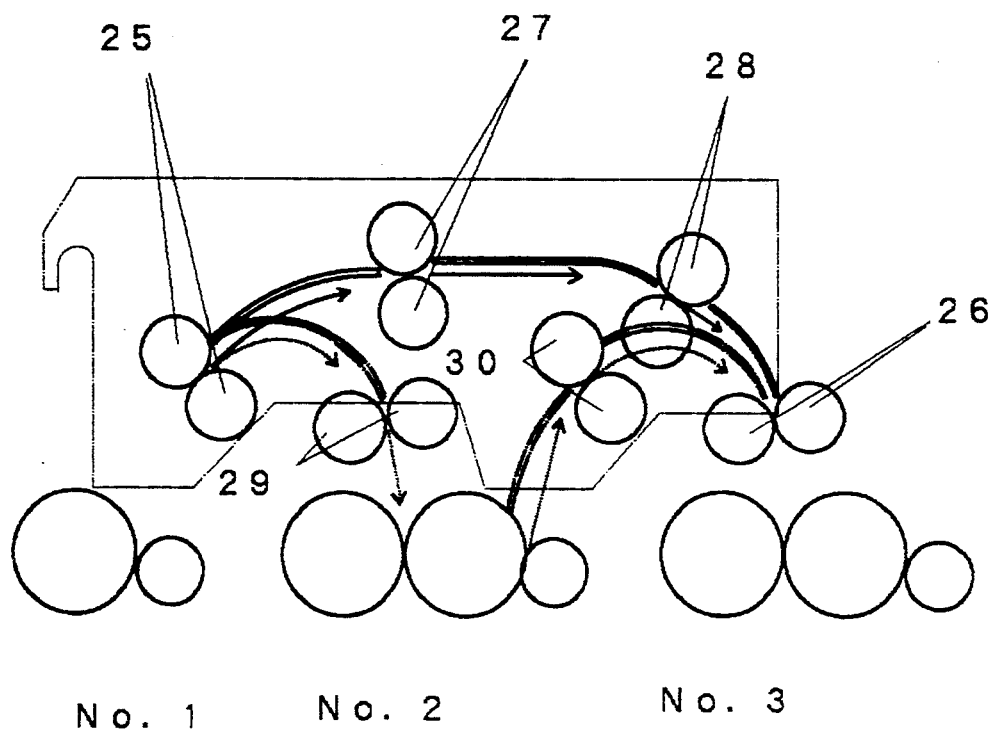
FIG. 34 shows in a cross-sectional view yet another embodiment of the development section of the print and development apparatus of the present invention.
Figure 35:
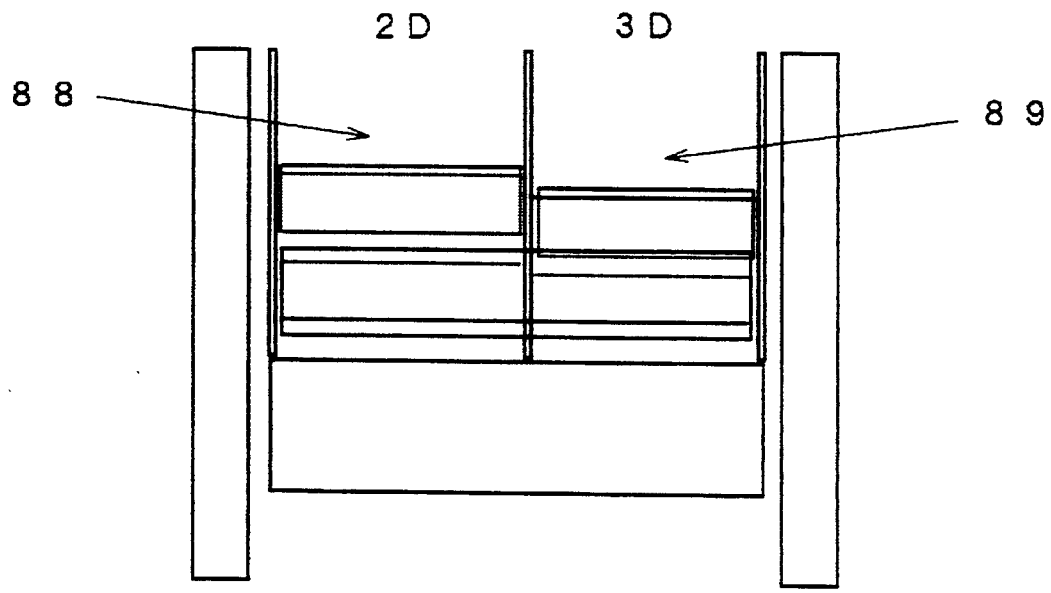
FIG. 35 shows a schematic side view of the development section.
Figure 36:
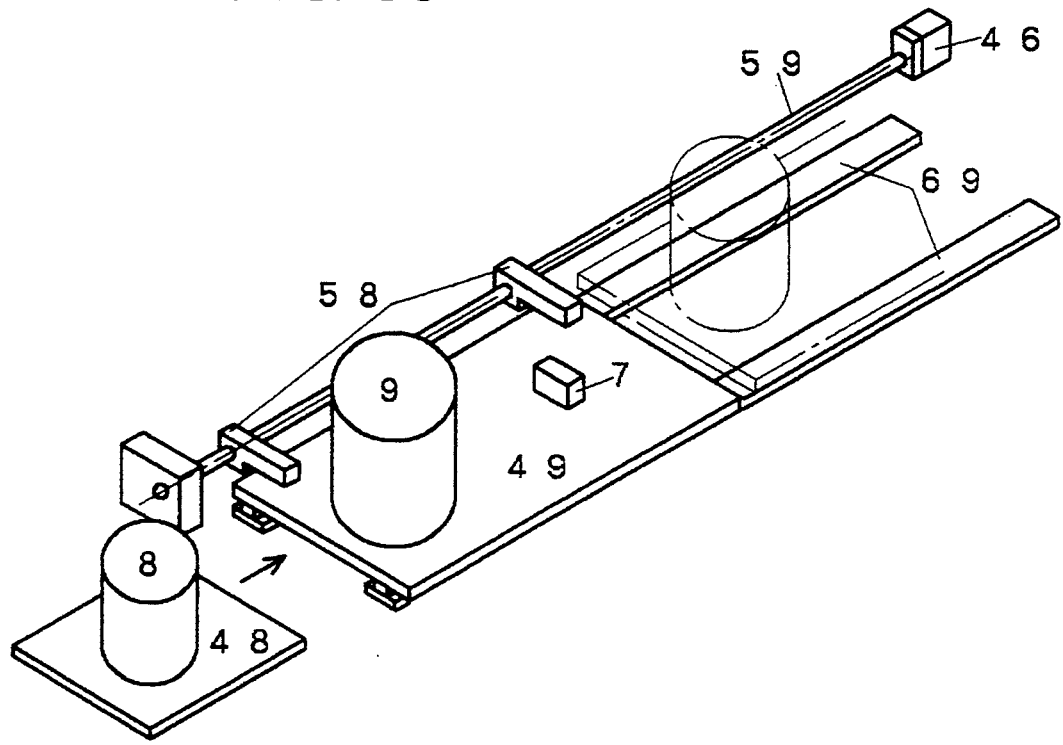
FIGS. 36 to 39 show one embodiment of the means for adjusting the positions of lenses of the print and development apparatus of the present invention.
Figure 37:
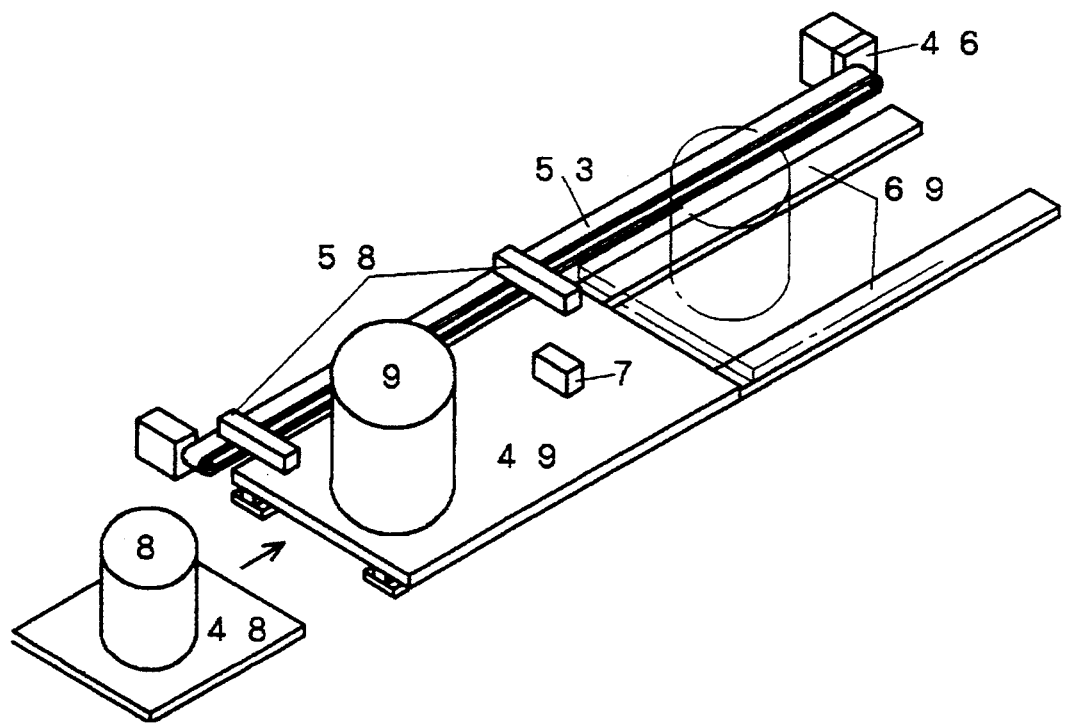
Figure 38:
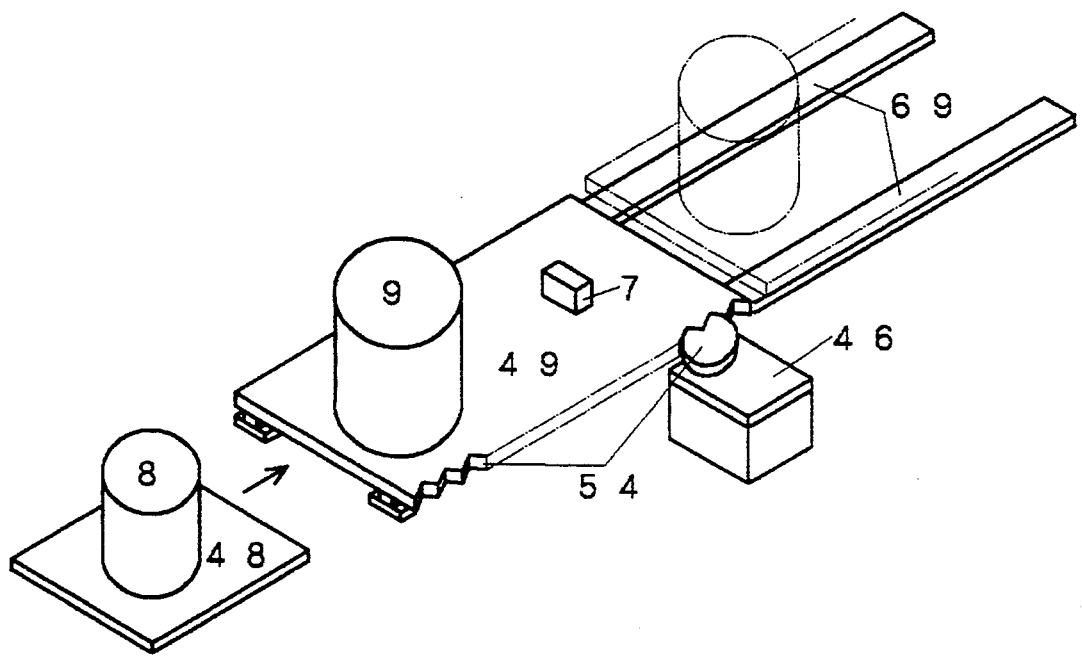
Figure 39:
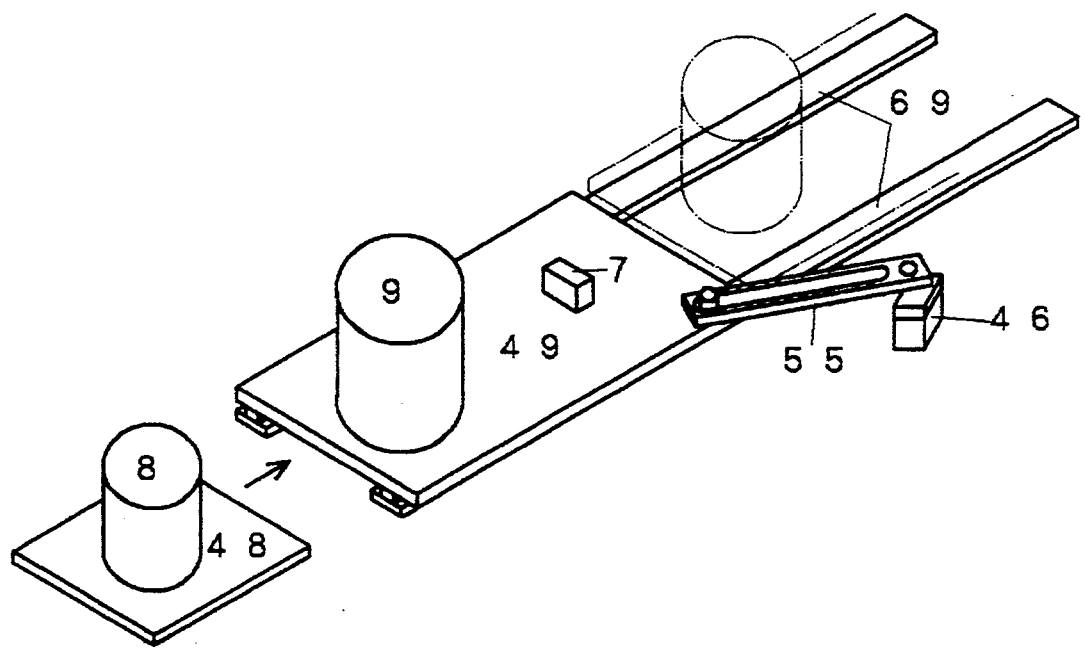
Figure 40:
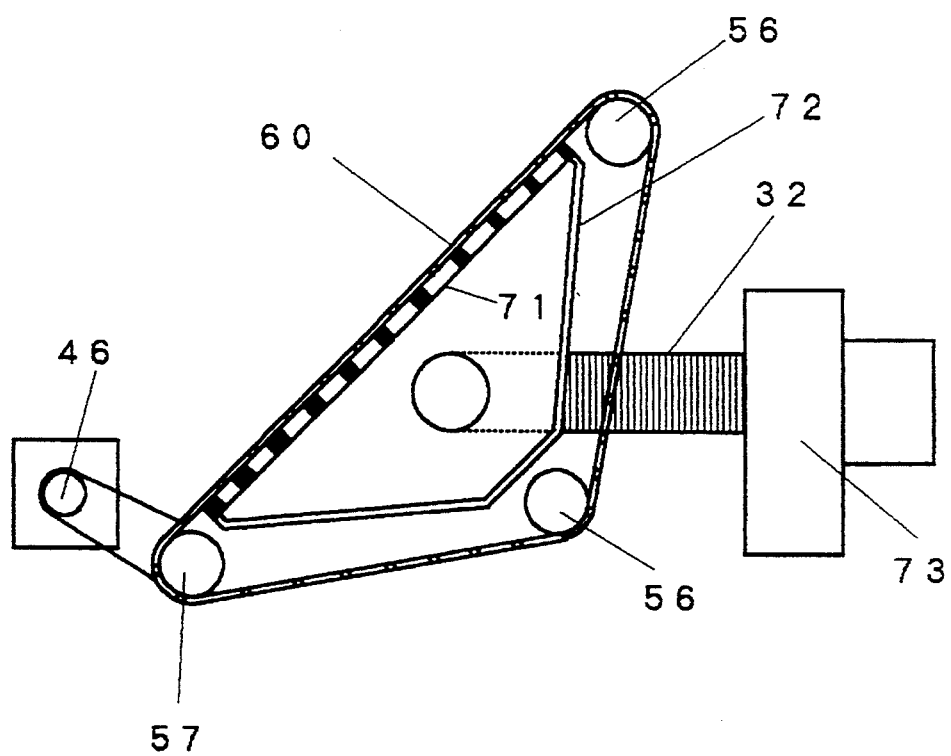
FIG. 40 shows in cross-sectional view an embodiment for suction type exposure-station.
Figure 42:
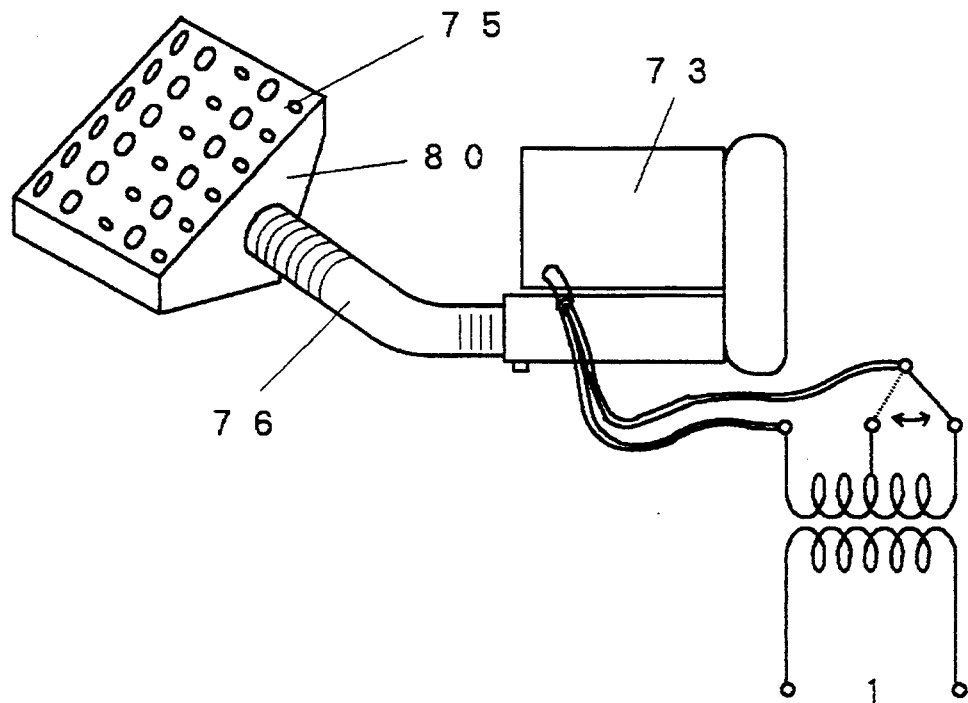
Figure 43:
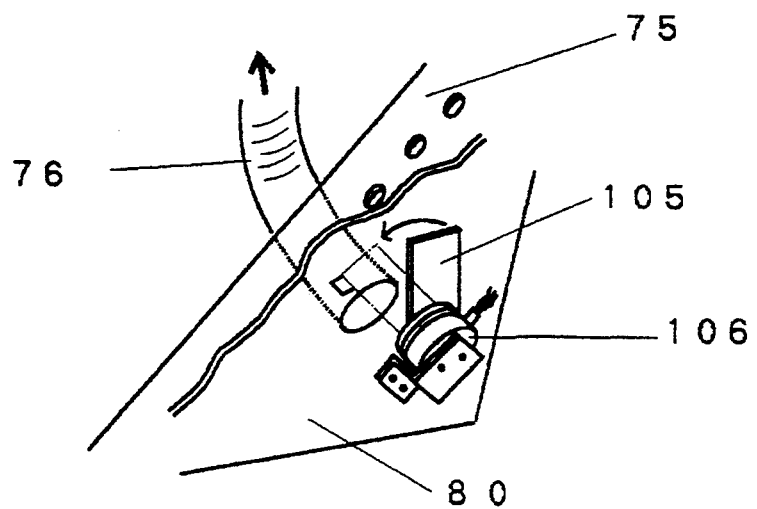
Figure 46:
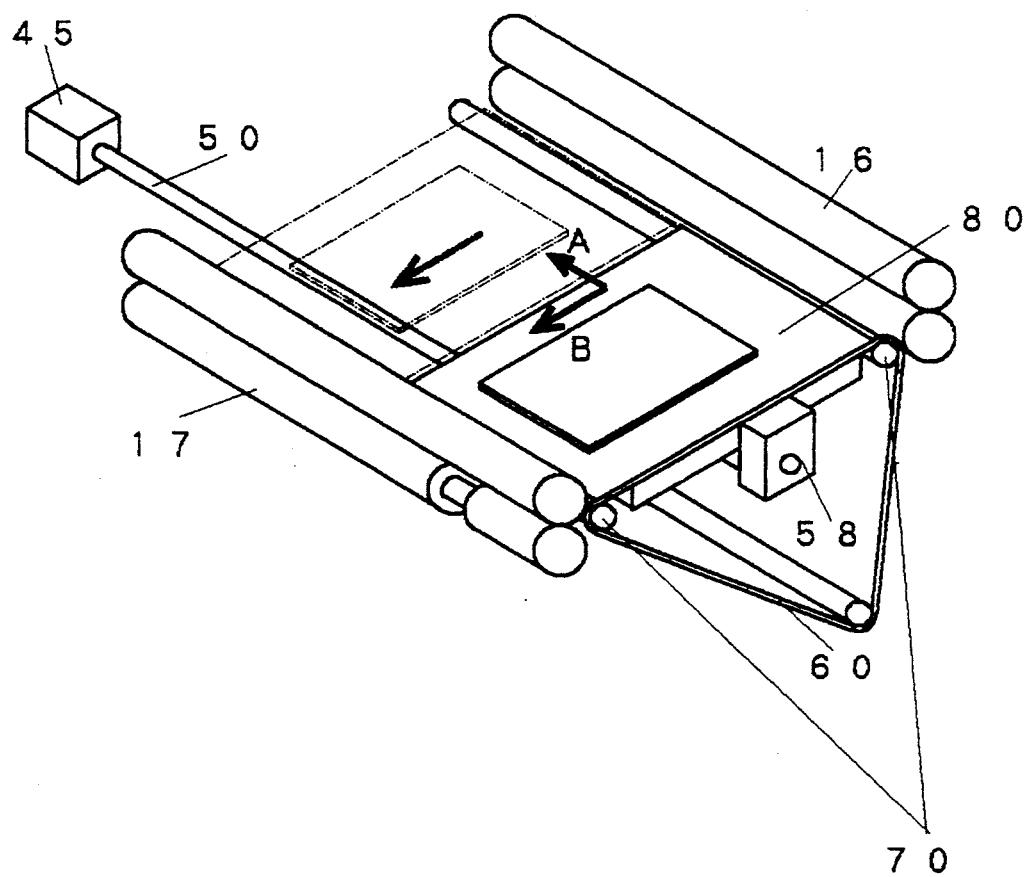
FIG. 46 is an illustration of how the process-lanes can be changed in the exposure station of the print and development apparatus of present invention.
Figure 47:
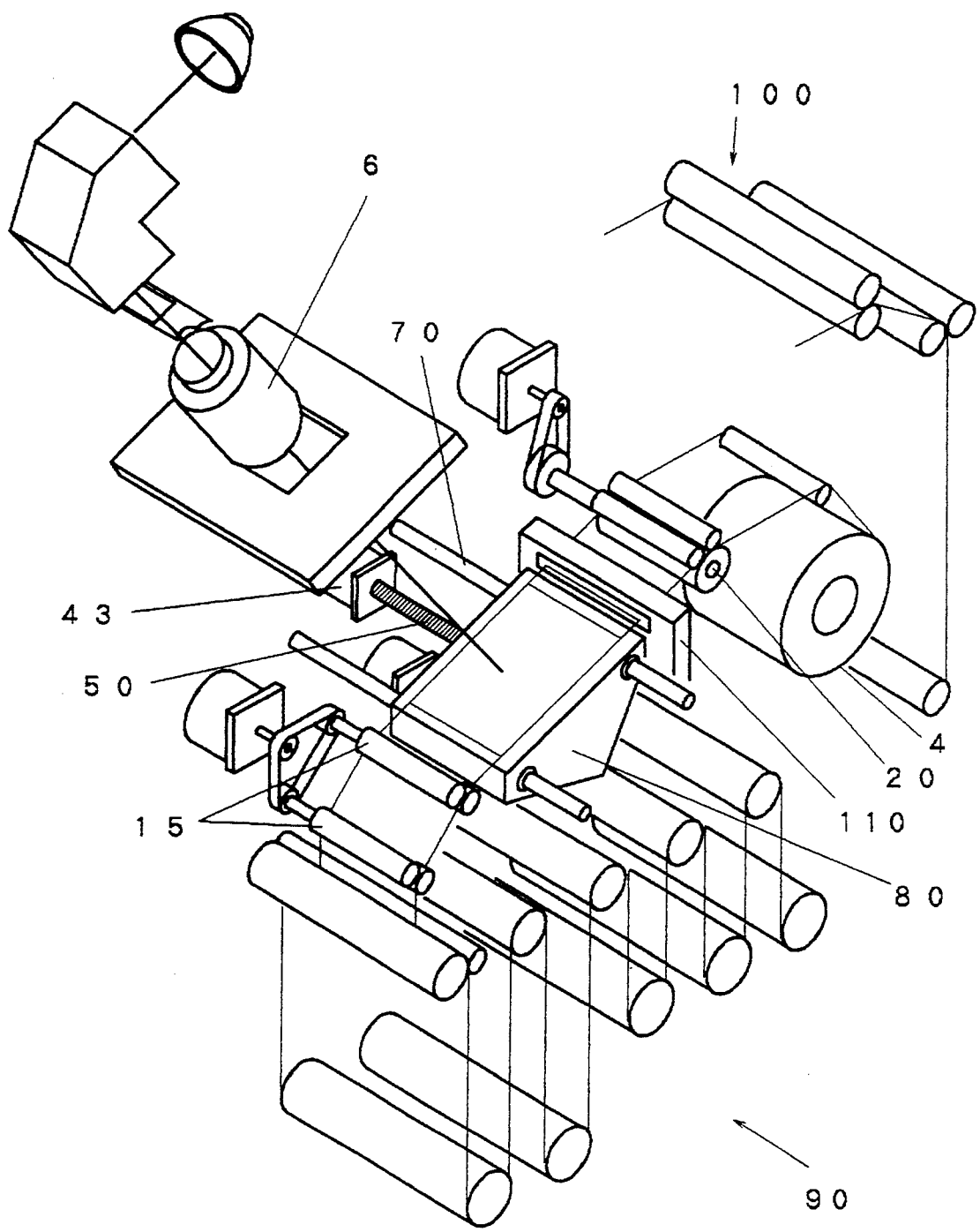
FIGS. 47 and 48 illustrate an embodiment of the structure of the print and development apparatus of the present invention.

The inventive print and development apparatus is described through illustrations. FIGS. 47 illustrates an embodiment of the structure of the inventive print and development apparatus. Labels in the Figure are: 4 is the photographic paper roller; 6 is the enlarging lens; 15 are exit rollers; 20 is a drive-roller, 43 is slide motor; 50 is slide thread; 70 is slide shaft; 80 is exposure station; 90 is photographic paper processor; 100 is the drying area exit; 110 is the cutter-section.

The operation of the apparatus shown in the figure is as follows. The photographic paper drawn out from the paper roller 4 by the drive-roller 20 is cut at the cutter-section 110 into a pre-fixed length. Being sucked by the exposure station 80, the severed piece of paper is conveyed to the exposure position. Having been supported by the slide shaft 70, the exposure station 80 can be moved in the paper conveying direction and also at right angles to that direction by the slide-motor 43 and by the slide-threads 50. In the case of 3D photographic printing, it is possible to select by this movement the exposure angle required for printing. Coupled with this movement, the enlarging lens 21 is also moved, tracking the movement of the exposure station. On the other hand, when the conventional printing is to take place, neither the exposure station nor the enlarging lens moves, rather they function under the stationary condition.

When exposure is complete, the paper is again conveyed in either of the cases, 3D or the conventional photography, by the exposure station 80. Having passed through the exit-rollers 15, the paper is fed to the paper-processor 90. Inside the paper-processor, conveyed by rollers and processed, the paper comes out of the dryer exit 100 as a finished print.

Figure 48:
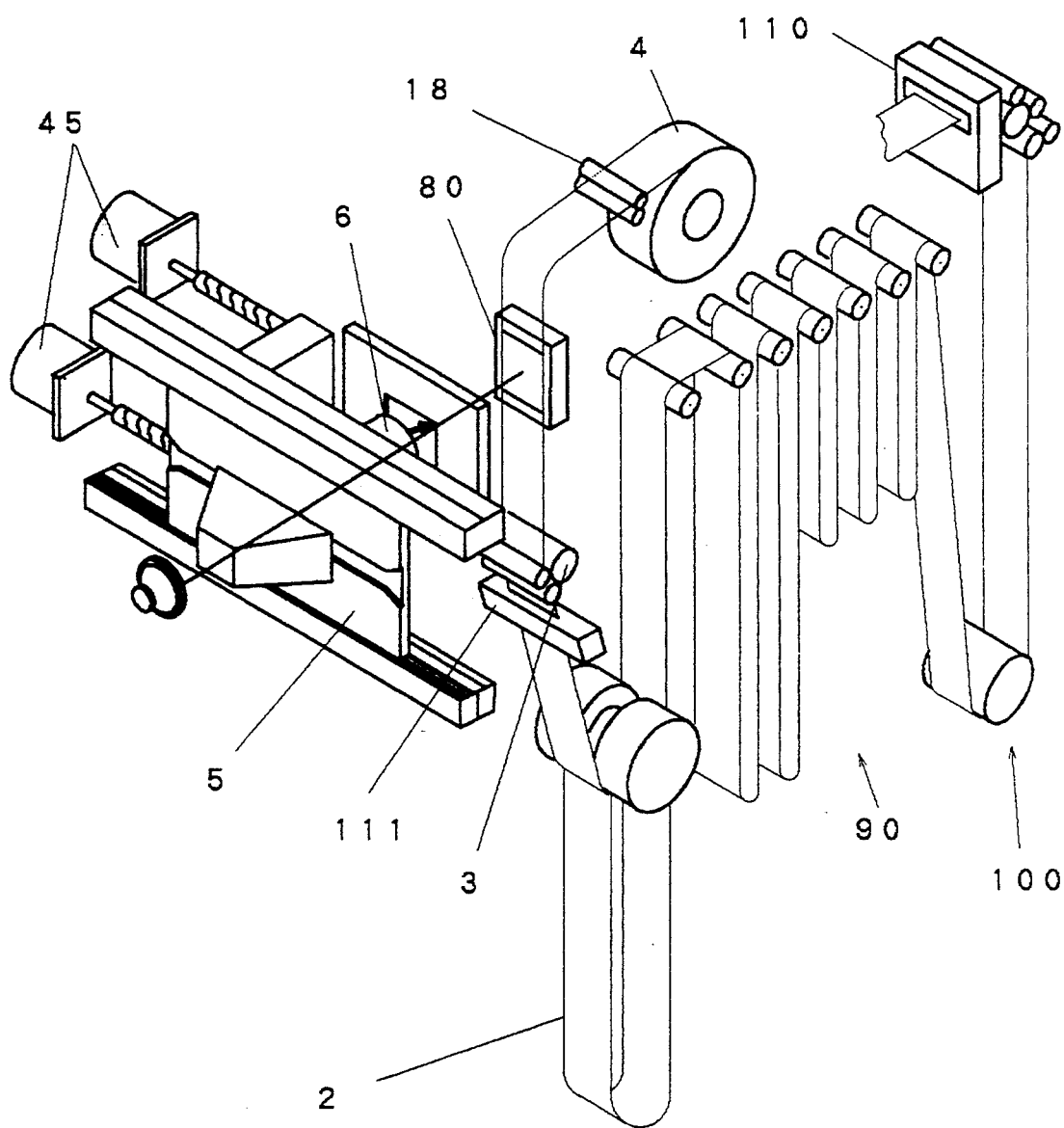

FIG. 48 illustrates another embodiment of the structure of the inventive print and development apparatus. Labels in the Figure are: 2 is looping section; 4 is the photographic paper roller; 5 is a negative mask; 6 is the enlarging lens; 18 are paper supply rollers; 20 is a drive-roller, 40 is a motor; 80 is exposure station; 90 is photographic paper processor; 100 is the drying section; 110 is the cutter-section; 111 is the first cutter. The photographic paper drawn out by the paper roller 4 passes through the supply-roller 18 and the exposure station 80 and reaches the drive-roller 20. Printing takes place in the exposure station 80 as usual, and in the case of 3D photography the exposure angle required for printing of 3D photographs are obtained by moving the negative mask 5 and the enlarging lens 6 in the direction of the arrow shown in the figure.

The motor 40 is the source for moving the negative mask 5 and the enlarging lens 6. They are not moved in the case of the conventional photographic printing; instead they are used being secured to their common light-axis. The lens movement can be accomplished by using a drive motor together with a feed thread, a feed belt, a rack and pinion mechanism or an actuator arm, and so on.

When the exposure is complete in either of the cases, 3D or the conventional photography, the paper is conveyed by the drive-roller 20, passes the looping section 2 and is fed to the paper-processor 90. When the uncut paper being fed into the paper-processor 90 reaches a certain pre-fixed length or when the operator wants to finish a sequence of printing operations, the first cutter 111 is activated and the paper is cut. The paper being sent to the paper-processor 90 in this manner is processed there, and having passed the dryer-section 100, the paper is cut at the cutting-section 110 into the length of the print-size. A sequence of processing is thus completed.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. An automated three-dimensional (3D) and conventional photographic printing apparatus, comprising:
   an operational section, comprising means for enabling a user to select one of a conventional process or a 3D photographic printing and development process;
   a cutter section where photographic paper is cut into sheet-form;
   an exposure station for adhering to a cut photographic paper so that the cut photographic paper can be moved for printing of 3D photographs;
   a lens section that can be moved coupled with said motion of the exposure station; and
   a means for conveying the printed photographic paper from the exposure station to the development section.

2. The automated three-dimensional (3D) and conventional photographic print and development apparatus of claim 1 wherein:
   said exposure station further includes means for varying an adhesive strength with which said cut photographic paper is adhered thereto.

3. The automated three-dimensional (3D) and conventional photographic print and development apparatus of claim 2, wherein:
   said development section further includes means for switching a route for conveying of said cut photographic paper.

4. The automated three-dimensional (3D) and conventional photographic print and development apparatus of claim 2, wherein:
   said development section further includes a dryer section that is formed such that a hot air flow can be provided to a selected side of said printed photographic paper.

5. The automated three-dimensional (3D) and conventional photographic print and development apparatus of claim 1, wherein:
   said development section further includes means for switching a route for conveying of said cut photographic paper.

6. The automated three-dimensional (3D) and conventional photographic print and development apparatus of claim 5, wherein:
said development section further includes a dryer section that is formed such that a hot air flow can be provided to a selected side of said printed photographic paper.

7. The automated three-dimensional (3D) and conventional photographic print and development apparatus of claim 1, wherein:
said development section further includes a dryer section that is formed such that a hot air flow can be provided to a selected side of said printed photographic paper.

8. Automated three-dimensional (3D) and conventional photographic printing and development apparatus, comprising:
an operation section comprising means for enabling a user to select one of a conventional process or a 3D photographic printing and development process;
means for feeding photographic paper to an exposure station from a roll of photographic paper;
mask and lens sections, respectively containing a negative mask and a magnifying lens, both of which are movable for 3D photographic printing;
means of conveying printed portions of photographic paper that are still attached to the roll of photographic paper from the exposure station to a development section; and
a cutter section where each of said portions of printed photographic paper is cut from the roll of paper.

9. The automated three-dimensional (3D) and conventional photographic printing and development apparatus of claim 8, further comprising:
a dryer apparatus that is formed such that a hot air flow can be selectively provided by said development section to a side of the printed photographic paper.

10. The automated three-dimensional (3D) and conventional photographic printing and development apparatus of claim 9 wherein:
said development section includes means for switching a route for conveying said photographic paper.

11. The automated three-dimensional (3D) and conventional photographic printing and development apparatus of claim 8, wherein:
said development section includes means for switching a route for conveying said photographic paper.

12. Automated three-dimensional (3D) and conventional photographic printing apparatus, comprising:
an operational section, comprising means for enabling a user to select one of a conventional process or a 3D photographic printing and development process;
a cutter section where a supply of photographic paper is cut into sheet-form;
an exposure station for adhering to a cut photographic paper so that the cut photographic paper can be moved for printing of 3D photographs;
a lens section that can be moved in correspondence with the exposure station; and
a means for reversing printed photographic papers.

13. Automated three-dimensional (3D) and conventional photographic printing apparatus, comprising:
means of switching a path of conveying a photographic paper in a direction along a width of the photographic paper by having a groove formed on one part of a periphery of a roller that feeds the photographic paper.

14. Automated three-dimensional (3D) and conventional photographic printing apparatus, comprising:
a plate that is constructed so that it can be moved on a light axis of an enlarging lens and a video camera that detects negatives, both the lens and the video camera being mounted on said plate.

* * * * *